United States Patent
Wu et al.

(10) Patent No.: US 11,621,816 B2
(45) Date of Patent: Apr. 4, 2023

(54) METHOD AND DEVICE IN UE AND BASE STATION USED FOR WIRELESS COMMUNICATION

(71) Applicants: Keying Wu, Shanghai (CN); Xiaobo Zhang, Shanghai (CN); Lin Yang, Shanghai (CN)

(72) Inventors: Keying Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 107 days.

(21) Appl. No.: 17/095,755

(22) Filed: Nov. 12, 2020

(65) Prior Publication Data

US 2021/0083813 A1 Mar. 18, 2021

Related U.S. Application Data

(63) Continuation of application No. PCT/CN2019/095964, filed on Jul. 15, 2019.

(30) Foreign Application Priority Data

Jul. 25, 2018 (CN) .......................... 201810825113.3

(51) Int. Cl.
*H04L 5/00* (2006.01)
*H04W 72/04* (2023.01)

(52) U.S. Cl.
CPC ........... *H04L 5/005* (2013.01); *H04W 72/042* (2013.01); *H04L 5/0005* (2013.01)

(58) Field of Classification Search
CPC ...... H04L 5/005; H04L 5/0005; H04L 5/0048; H04W 72/042
(Continued)

(56) References Cited

U.S. PATENT DOCUMENTS

2014/0198763 A1* 7/2014 Sorrentino .......... H04L 27/2675
370/330
2016/0135194 A1 5/2016 Kim
(Continued)

FOREIGN PATENT DOCUMENTS

| CN | 102685826 A | 9/2012 |
|---|---|---|
| CN | 107431522 A | 12/2017 |

(Continued)

OTHER PUBLICATIONS

ISR in application PCT/CN2019/095964 dated Sep. 30, 2019.
(Continued)

*Primary Examiner* — Rownak Islam

(57) ABSTRACT

The present disclosure provides a method and a device in a User Equipment (UE) and a base station used for wireless communications. The UE receives first information; determines first sub-information out of the M piece(s) of sub-information; receives a first radio signal in a first time-frequency resource set; the first information comprises the M piece(s) of sub-information, each of the M piece(s) of sub-information indicates a reference signal group, and a reference signal group comprises at least one reference signal. The first sub-information indicates a first reference signal group. A reference signal in a reference signal group indicated by at least one of the M piece(s) of sub-information is transmitted by a first serving cell, and the first serving cell is not added by the UE. The above method not only obtains performance advancement brought by serving cell handover, but also avoid time delay and service interrupt.

18 Claims, 15 Drawing Sheets

(58) Field of Classification Search
USPC .......................................................... 370/329
See application file for complete search history.

(56) References Cited

U.S. PATENT DOCUMENTS

2017/0373743 A1    12/2017  Park
2019/0246384 A1*    8/2019  Shao ................... H04W 72/044

FOREIGN PATENT DOCUMENTS

| CN | 108012274 A | | 5/2018 |
|---|---|---|---|
| CN | 110474660 A | * | 11/2019 |
| WO | 2017204739 A1 | | 11/2017 |
| WO | 2018128520 A1 | | 7/2018 |
| WO | 2020/222621 A1 | | 11/2020 |

OTHER PUBLICATIONS

3GPP Technical Specification Group Radio Access Network, NR Radio Resource Control (RRC) protcol Specification relase 15 Jun. 30, 2018.

3GPP Technical Specification Group Radio Access Network, NR ,Physical Layer Procedures for Data Jun. 30, 2018.

1st Office Action received in applicant No. 201810825113.3 dated May 21, 2020.

1st Search Report in application No. 201810825113.3 dated May 15, 2020.

Provisional opinion accompanying the partial search result of EP19841459.1.

Search opinion of EP19841459.1.

Search report of EP19841459.1, dated Aug. 12, 2021.

Search opinion of IN202117005429, dated Dec. 1, 2022.

"RAN1 NR-Adhoc#3(Sep. 2017)", 3GPP Draft;List of RAN1 Agreements,3rd Generation Partnership Project (3GPP), Mobile Competence Centre; 650, Route Des Lucioles; F-06921 Sophia-Antipolis Cedex; France vol. RAN WG1, No.; Sep 1, 2017 Dec. 12, 2017(Dec. 12, 2017).

Ericsson: "Remaining issues on beam measurement and reporting", 3GPP Draft;R1-1806217 Remaining Issues for Beam Measurement and REPORTING,3rd Generation Partnership PROJECT(3GPP), Mobile Competence Centre; 650, Route Des Lucioles;F-06921 Sophia-Antipolis CED vol. RAN WG1, No. Busan, Korea; May 21, 2018-May 25, 2018 May 12, 2018(May 12, 2018).

* cited by examiner

First reference signal group = { first reference signal, second reference signal }

First reference signal group = { first reference signal }

| Second information | Index of first serving cell | Index(es) of N1 reference signal(s) | ... |

| Third information | M1 sub-signal(s) | ... |

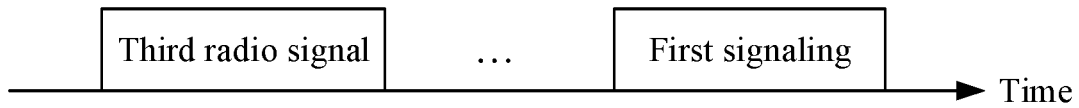
FIG. 18
First parameter ⟶ First radio signal
FIG. 19
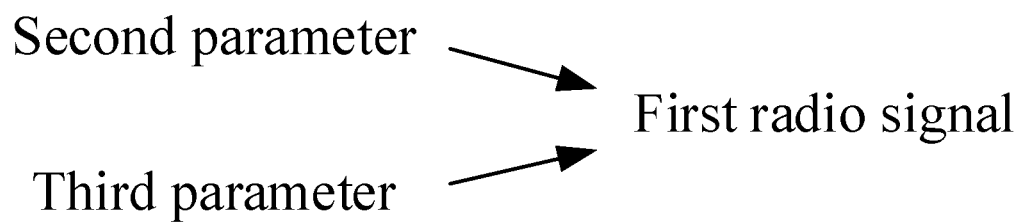
FIG. 20

Fourth parameter ⟶ First signaling
FIG. 21
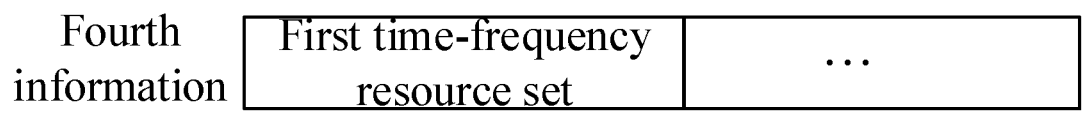
FIG. 22
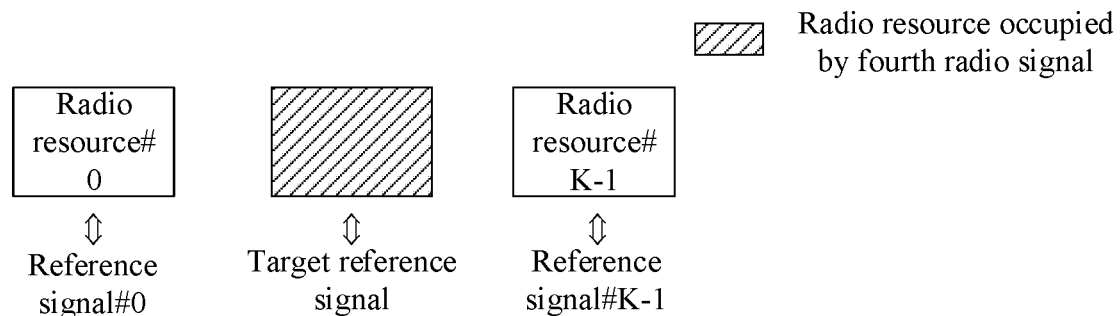
FIG. 23

METHOD AND DEVICE IN UE AND BASE STATION USED FOR WIRELESS COMMUNICATION

CROSS REFERENCE TO RELATED APPLICATIONS

This application is a continuation of International Application No. PCT/CN2019/095964, filed Jul. 15, 2019, claims the priority benefit of Chinese Patent Application No. 201810825113.3, filed on Jul. 25, 2018, the full disclosure of which is incorporated herein by reference.

BACKGROUND

Technical Field

The present disclosure relates to methods and devices in wireless communication systems, and in particular to a method and a device in a wireless communication system that supports multiple antennas.

Related Art

In LTE system, inter-cell handover is controlled by the base station based on User Equipment's (UE) measurement. Inter-cell handover in 3rd Generation Partner Project(3GPP) Release 15 (R15) basically follows mechanism in LTE. In New Radio (NR) system, more application scenarios need to be supported, wherein some typical application scenarios, such as Ultra-Reliable and Low Latency Communications (URLLC), put forward very high requirements on time delay and new challenges on inter-cell handover.

In NR system, Massive Multiple Input Multiple Output (MIMO) is an important technical feature. In the massive MIMO, multiple antennas based on beamforming to form a relatively narrow beam which points to a particular direction to improve communication quality. A beam formed based on multi-antenna beamforming is generally narrow, so that beams of both sides that are in communication need to be aligned for effective communications.

SUMMARY

Inventors find through researches that beam-based communications will bring negative impacts on inter-cell handover, such as extra time delay and ping-pong effect. How to reduce these negative impacts and use beamforming technology to further improve performance of cell-boundary users so as to meet requirements of various application scenarios are problems to be solved.

In view of the above problem, the present disclosure provides a solution. It should be noted that the embodiments of a UE in the present disclosure and the characteristics in the embodiments may be applied to a base station if no conflict is incurred, and vice versa. The embodiments of the present disclosure and the characteristics of the embodiments may be mutually combined if no conflict is incurred.

The present disclosure provides a method in a UE for wireless communications, comprising:

receiving first information, the first information comprising M piece(s) of sub-information, each of the M piece(s) of sub-information indicating a reference signal group, a reference signal group comprising at least one reference signal;

determining first sub-information out of the M piece(s) of sub-information, the first sub-information indicating a first reference signal group; and receiving a first radio signal in a first time-frequency resource set;

herein, a reference signal in a reference signal group indicated by at least one of the M piece(s) of sub-information is transmitted by a first serving cell, and the first serving cell is not added by the UE; the UE assumes that a transmission antenna port of the first radio signal and a transmission antenna port of any reference signal in the first reference signal group are Quasi Co-Located (QCL), M being a positive integer.

In one embodiment, a problem needed to be solved in the present disclosure is: how to reduce and avoid time-delay and service interrupt incurred by inter-cell handover. The above method achieves seamless handover among beams in different serving cells by including reference signals from neighbor cells in the Transmission Configuration Indication (TCI) list, thus solving the problem.

In one embodiment, the above method is characterized in that the M piece(s) of sub-information is(are) M TCI-state(s) configured for the UE, at least one of reference signal(s) indicated by the M piece(s) of sub-information is from a neighbor cell. Through activation/indication of TCI-state, the UE can achieve seamless handover among beams in different serving cells, also the handover processes are transparent to the UE.

In one embodiment, the above method is advantageous in that it avoids time-delay and potential service interrupt incurred by inter-cell handover, as well as reduces implementation complexity when achieving performance advancement brought by serving-cell handover.

According to one aspect of the present disclosure, comprising:

receiving N reference signal(s);

herein, N1 reference signal(s) in the N reference signal(s) is(are) transmitted by the first serving cell; a reference signal in a reference signal group indicated by at least one of the M piece(s) of sub-information is a reference signal in the N1 reference signal(s), N being a positive integer, N1 being a positive integer no greater than the N.

According to one aspect of the present disclosure, comprising:

receiving second information on the first serving cell;

herein, the second information indicates index(es) of the N1 reference signal(s) and an index of the first serving cell.

According to one aspect of the present disclosure, comprising:

receiving a second radio signal;

herein, the second radio signal carries third information, the third information being used for activating M1 piece(s) of sub-information out of the M piece(s) of sub-information, and the first sub-information is one of the M1 piece(s) of sub-information, M1 being a positive integer no greater than the M.

According to one aspect of the present disclosure, comprising:

transmitting a third radio signal;

herein, the third radio signal is used for determining that the second radio signal is correctly received.

According to one aspect of the present disclosure, wherein the first radio signal is transmitted on a physical-layer control channel; and the first information indicates the first time-frequency resource set.

According to one aspect of the present disclosure, comprising:

receiving a first signaling;

herein, the first radio signal is transmitted on a physical-layer data channel, and the first signaling comprises scheduling information of the first radio signal; and the first signaling indicates the first sub-information.

According to one aspect of the present disclosure, comprising:

transmitting a fourth radio signal;

herein, the fourth radio signal indicates a target reference signal out of K reference signal(s), at least one of the K reference signal(s) is transmitted by the first serving cell; and the target reference signal is used for determining whether the first radio signal is transmitted by the first serving cell.

The present disclosure provides a method in a first base station for wireless communications, comprising:

transmitting first information, the first information comprising M piece(s) of sub-information, each of the M piece(s) of sub-information indicating a reference signal group, a reference signal group comprising at least one reference signal;

determining first sub-information out of the M piece(s) of sub-information, the first sub-information indicating a first reference signal group; and transmitting a first radio signal in a first time-frequency resource set, wherein a reference signal in the first reference signal group is transmitted by a serving cell maintained by the first base station; or, dropping transmission of the first radio signal in the first time-frequency resource set, wherein a reference signal in the first reference signal group is not transmitted by a serving cell maintained by the first base station;

herein, a reference signal in a reference signal group indicated by at least one of the M piece(s) of sub-information is transmitted by a first serving cell, and the first serving cell is not added by the a target receiver of the first radio signal; at least one serving cell maintained by the first base station is added by the target receiver of the first radio signal; the target receiver of the first radio signal assumes that a transmission antenna port of the first radio signal and a transmission antenna port of any reference signal in the first reference signal group are QCL, M being a positive integer.

According to one aspect of the present disclosure, comprising:

transmitting N2 reference signal(s) on a second serving cell, herein, the first base station is a maintenance base station of the second serving cell, and the second serving cell is added by the target receiver of the first radio signal; a reference signal in a reference signal group indicated by at least one of the M piece(s) of sub-information is a reference signal in the N2 reference signal(s), N2 being a positive integer.

According to one aspect of the present disclosure, comprising:

transmitting a second radio signal;

herein, the second radio signal carries third information, the third information being used for activating M1 piece(s) of sub-information out of the M piece(s) of sub-information, and the first sub-information is one of the M1 piece(s) of sub-information, M1 being a positive integer no greater than the M.

According to one aspect of the present disclosure, comprising:

receiving a third radio signal;

herein, the third radio signal is used for determining that the second radio signal is correctly received.

According to one aspect of the present disclosure, wherein the first radio signal is transmitted on a physical-layer control channel; and the first information indicates the first time-frequency resource set.

According to one aspect of the present disclosure, comprising:

transmitting a first signaling;

herein, the first radio signal is transmitted on a physical-layer data channel, and the first signaling comprises scheduling information of the first radio signal; and the first signaling indicates the first sub-information.

According to one aspect of the present disclosure, comprising at least one of the following:

transmitting fourth information via a backhaul; and receiving sixth information via a backhaul;

herein, the fourth information indicates the first time-frequency resource set; the sixth information indicates index(es) of N1 reference signal(s), the N1 reference signal(s) is(are) transmitted by the first serving cell, and a reference signal in a reference signal group indicated by at least one of the M piece(s) of sub-information is a reference signal in the N1 reference signal(s), N1 being a positive integer.

In one embodiment, the above method is advantageous in that the first serving cell is allowed to transmit data in a transparent way to UE, which avoids time-delay and potential service interrupt brought by inter-cell handover.

The present disclosure provides a method in a second base station for wireless communications, comprising:

receiving fifth information; and transmitting a first radio signal in a first time-frequency resource set; or, dropping transmission of the first radio signal in the first time-frequency resource set;

herein, the fifth information indicates whether the second base station transmits the first radio signal in the first time-frequency resource set, any serving cell maintained by the second base station is not added by a target receiver of the first radio signal.

According to one aspect of the present disclosure, comprising:

transmitting N1 reference signal(s) on a first serving cell;

herein, the second base station is a maintenance base station of the first serving cell; when the second base station transmits the first radio signal in the first time-frequency resource set, the target receiver of the first radio signal assumes that a transmission antenna port of the first radio signal and a transmission antenna port of one of the N1 reference signal(s) are QCL, N1 being a positive integer.

According to one aspect of the present disclosure, comprising:

transmitting second information on a first serving cell;

herein, the second information indicates index(es) of the N1 reference signal(s) and an index of the first serving cell.

According to one aspect of the present disclosure, comprising at least one of the following:

receiving fourth information via a backhaul; and transmitting sixth information via a backhaul;

herein, the fourth information indicates the first time-frequency resource set; the sixth information indicates index(es) of N1 reference signal(s), the N1 reference signal(s) is(are) transmitted by a first serving cell, and the second base station is a maintenance base station of the first serving cell; when the second base station transmits the first radio signal in the first time-frequency resource set, the target receiver of the first radio signal assumes that a transmission antenna port of the first radio signal and a transmission antenna port of one of the N1 reference signal(s) are QCL, N1 being a positive integer.

According to one aspect of the present disclosure, comprising:

receiving a fourth radio signal via an air interface;

herein, the fourth radio signal indicates a target reference signal out of K reference signal(s), at least one of the K reference signal(s) is transmitted by a first serving cell, the second base station is a maintenance base station of the first serving cell; and the target reference signal is used for determining the fifth information.

According to one aspect of the present disclosure, wherein the fifth information is received via a backhaul.

According to one aspect of the present disclosure, wherein the fifth information indicates that the second base station transmits the first radio signal in the first time-frequency resource set; the fifth information indicates a first reference signal group, and the first reference signal group comprises at least one reference signal; a target receiver of the first radio signal assumes that a transmission antenna port of the first radio signal and a transmission antenna port of any reference signal in the first reference signal group are QCL.

According to one aspect of the present disclosure, comprising:

transmitting a first signaling;

herein, the first radio signal is transmitted on a physical-layer data channel, and the first signaling comprises scheduling information of the first radio signal; and the first signaling indicates the first reference signal group.

The present disclosure provides a UE for wireless communications, comprising:

a first receiver, receiving first information, the first information comprising M piece(s) of sub-information, each of the M piece(s) of sub-information indicating a reference signal group, a reference signal group comprising at least one reference signal;

a first processor, determining first sub-information out of the M piece(s) of sub-information, the first sub-information indicating a first reference signal group;

a second receiver, receiving a first radio signal in a first time-frequency resource set;

herein, a reference signal in a reference signal group indicated by at least one of the M piece(s) of sub-information is transmitted by a first serving cell, and the first serving cell is not added by the UE; the UE assumes that a transmission antenna port of the first radio signal and a transmission antenna port of any reference signal in the first reference signal group are QCL, M being a positive integer.

In one embodiment, the above UE for wireless communications is characterized in that the first receiver receives N reference signals; herein, N1 reference signal(s) in the N reference signal(s) is(are) transmitted by the first serving cell; a reference signal in a reference signal group indicated by at least one of the M piece(s) of sub-information is a reference signal in the N1 reference signal(s), N being a positive integer, N1 being a positive integer no greater than the N.

In one embodiment, the above UE for wireless communications is characterized in that the first receiver receives second information on the first serving cell; herein, the second information indicates index(es) of the N1 reference signal(s) and an index of the first serving cell.

In one embodiment, the above UE for wireless communications is characterized in that the first receiver receives a second radio signal; herein, the second radio signal carries third information, the third information being used for activating M1 piece(s) of sub-information out of the M piece(s) of sub-information, and the first sub-information is one of the M1 piece(s) of sub-information, M1 being a positive integer no greater than the M.

In one embodiment, the above UE for wireless communications is characterized in that the first processor transmits a third radio signal; herein, the third radio signal is used for determining that the second radio signal is correctly received.

In one embodiment, the above UE for wireless communications is characterized in that the first radio signal is transmitted on a physical-layer control channel; and the first information indicates the first time-frequency resource set.

In one embodiment, the above UE for wireless communications is characterized in that the second receiver receives a first signaling; herein, the first radio signal is transmitted on a physical-layer data channel, and the first signaling comprises scheduling information of the first radio signal; and the first signaling indicates the first sub-information.

In one embodiment, the above UE for wireless communications is characterized in that the first processor transmits a fourth radio signal; herein, the fourth radio signal indicates a target reference signal out of K reference signal(s), at least one of the K reference signal(s) is transmitted by the first serving cell; and the target reference signal is used for determining whether the first radio signal is transmitted by the first serving cell.

The present disclosure provides a first base station for wireless communications, comprising:

a first transmitter, transmitting first information, the first information comprising M piece(s) of sub-information, each of the M piece(s) of sub-information indicating a reference signal group, a reference signal group comprising at least one reference signal;

a second processor, determining first sub-information out of the M piece(s) of sub-information, the first sub-information indicating a first reference signal group; and a second transmitter, transmitting a first radio signal in a first time-frequency resource set, wherein a reference signal in the first reference signal group is transmitted by a serving cell maintained by the first base station; or, dropping transmission of the first radio signal in the first time-frequency resource set, wherein a reference signal in the first reference signal group is not transmitted by a serving cell maintained by the first base station;

herein, a reference signal in a reference signal group indicated by at least one of the M piece(s) of sub-information is transmitted by a first serving cell, and the first serving cell is not added by the a target receiver of the first radio signal; at least one serving cell maintained by the first base station is added by the target receiver of the first radio signal; the target receiver of the first radio signal assumes that a transmission antenna port of the first radio signal and a transmission antenna port of any reference signal in the first reference signal group are QCL, M being a positive integer.

In one embodiment, the above first base station for wireless communications is characterized in that the first transmitter transmits N2 reference signal(s) on a second serving cell; herein, the first base station is a maintenance base station of the second serving cell, and the second serving cell is added by the target receiver of the first radio signal; a reference signal in a reference signal group indicated by at least one of the M piece(s) of sub-information is a reference signal in the N2 reference signal(s), N2 being a positive integer.

In one embodiment, the above first base station for wireless communications is characterized in that the first transmitter transmits a second radio signal; herein, the second radio signal carries third information, the third information being used for activating M1 piece(s) of sub-information out of the M piece(s) of sub-information, and the first sub-information is one of the M1 piece(s) of sub-information, M1 being a positive integer no greater than the M.

In one embodiment, the above first base station for wireless communications is characterized in that the second processor receives a third radio signal; herein, the third radio signal is used for determining that the second radio signal is correctly received.

In one embodiment, the above first base station for wireless communications is characterized in that the first radio signal is transmitted on a physical-layer control channel, and the first information indicates the first time-frequency resource set.

In one embodiment, the above first base station for wireless communications is characterized in that the second transmitter transmits a first signaling; herein, the first radio signal is transmitted on a physical-layer data channel, and the first signaling comprises scheduling information of the first radio signal; and the first signaling indicates the first sub-information.

In one embodiment, the above first base station for wireless communications is characterized in that the second processor transmits fourth information via a backhaul; herein, the fourth information indicates the first time-frequency resource set.

In one embodiment, the above first base station for wireless communications is characterized in that the second processor receives sixth information via a backhaul; herein, the sixth information indicates index(es) of N1 reference signal(s), the N1 reference signal(s) is(are) transmitted by the first serving cell, and a reference signal in a reference signal group indicated by at least one of the M piece(s) of sub-information is a reference signal in the N1 reference signal(s), N1 being a positive integer.

The present disclosure provides a second base station for wireless communications, comprising:

a third receiver, receiving fifth information; and a third transmitter, transmitting a first radio signal in a first time-frequency resource set; or, dropping transmission of the first radio signal in the first time-frequency resource set;

herein, the fifth information indicates whether the second base station transmits the first radio signal in the first time-frequency resource set, and any serving cell maintained by the second base station is not added by a target receiver of the first radio signal.

In one embodiment, the above second base station for wireless communications is characterized in that the third transmitter transmits N1 reference signal(s) on a first serving cell; herein, the second base station is a maintenance base station of the first serving cell; when the second base station transmits the first radio signal in the first time-frequency resource set, the target receiver of the first radio signal assumes that a transmission antenna port of the first radio signal and a transmission antenna port of one of the N1 reference signal(s) are QCL, N1 being a positive integer.

In one embodiment, the above second base station for wireless communications is characterized in that the third transmitter transmits second information on the first serving cell; herein, the second information indicates index(es) of the N1 reference signal(s) and an index of the first serving cell.

In one embodiment, the above second base station for wireless communications is characterized in that the third receiver receives fourth information via a backhaul; herein, the fourth information indicates the first time-frequency resource set.

In one embodiment, the above second base station for wireless communications is characterized in that the third transmitter transmits sixth information via a backhaul; herein, the sixth information indicates index(es) of N1 reference signal(s), the N1 reference signal(s) is(are) transmitted by a first serving cell, and the second base station is a maintenance base station of the first serving cell; when the second base station transmits the first radio signal in the first time-frequency resource set, the target receiver of the first radio signal assumes that a transmission antenna port of the first radio signal and a transmission antenna port of one of the N1 reference signal(s) are QCL, N1 being a positive integer.

In one embodiment, the above second base station for wireless communications is characterized in that the third receiver receives a fourth radio signal via an air interface; herein, the fourth radio signal indicates a target reference signal out of K reference signal(s), at least one of the K reference signal(s) is transmitted by a first serving cell, the second base station is a maintenance base station of the first serving cell, and the target reference signal is used for determining the fifth information.

In one embodiment, the above second base station for wireless communications is characterized in that the fifth information is received via a backhaul.

In one embodiment, the above second base station for wireless communications is characterized in that the fifth information indicates that the second base station transmits the first radio signal in the first time-frequency resource set; the fifth information indicates a first reference signal group, and the first reference signal group comprises at least one reference signal; a target receiver of the first radio signal assumes that a transmission antenna port of the first radio signal and a transmission antenna port of any reference signal in the first reference signal group are QCL.

In one embodiment, the above second base station for wireless communications is characterized in that the third transmitter transmits a first signaling; herein, the first radio signal is transmitted on a physical-layer data channel, the first signaling comprises scheduling information of the first radio signal; and the first signaling indicates the first reference signal group.

In one embodiment, the present disclosure has the following advantages over conventional schemes:

a reference signal from a neighbor cell is configured in a TCI state list of a UE, and seamless handover of beams in different serving cells is realized in a way transparent to UE through TCI-state activation/indication. It not only obtains performance advancement brought by beam handover of different serving cells, but also avoids time delay and potential service interrupt incurred by inter-cell handover, besides, it can be implemented with a very low complexity.

BRIEF DESCRIPTION OF THE DRAWINGS

Other features, objects and advantages of the present disclosure will become more apparent from the detailed description of non-restrictive embodiments taken in conjunction with the following drawings:

FIG. 18 illustrates a schematic diagram of a relation between time resources occupied by a third radio signal and time resources occupied by a first signaling according to one embodiment of the present disclosure.

FIG. 19 illustrates a schematic diagram of generating a first radio signal according to one embodiment of the present disclosure.

FIG. 20 illustrates a schematic diagram of generating a first radio signal according to one embodiment of the present disclosure.

FIG. 21 illustrates a schematic diagram of generating a first signaling according to one embodiment of the present disclosure.

FIG. 22 illustrates a schematic diagram of fourth information content according to one embodiment of the present disclosure.

FIG. 23 illustrates a schematic diagram of a fourth radio signal according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
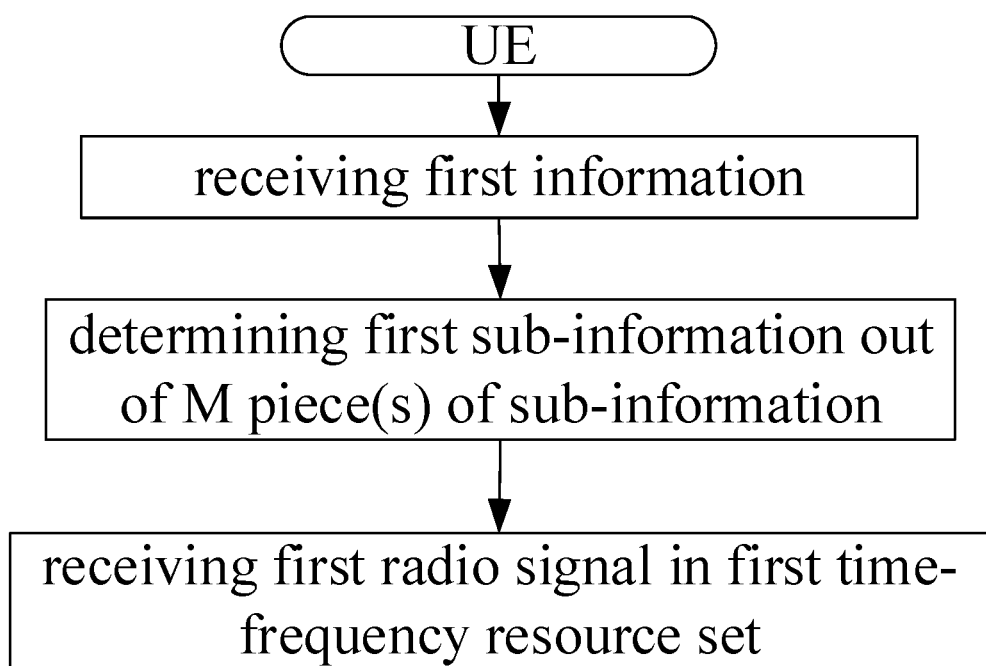
FIG. 1 illustrates a flowchart of first information, first sub-information and a first radio signal according to one embodiment of the present disclosure.

Embodiment 1 illustrates a flowchart of first information, first sub-information and a first radio signal, as shown in FIG. 1.

In Embodiment 1, the UE in the present disclosure receives first information; determines first sub-information out of M piece(s) of sub-information; and receives a first radio signal in a first time-frequency resource set; herein, the first information comprises the M piece(s) of sub-information, each of the M piece(s) of sub-information indicates a reference signal group, and a reference signal group comprises at least one reference signal; the first sub-information indicates a first reference signal group; a reference signal in a reference signal group indicated by at least one of the M piece(s) of sub-information is transmitted by a first serving cell, and the first serving cell is not added by the UE; the UE assumes that a transmission antenna port of the first radio signal and a transmission antenna port of any reference signal in the first reference signal group are QCL, M being a positive integer.

In one embodiment, the M is equal to 1.

In one embodiment, the M is greater than 1.

In one embodiment, the M is a positive integer no greater than maxNrofTCI-StatesPDCCH, and the specific meaning of the maxNrofTCI-StatesPDCCH can be found in 3GPP TS38.331.

In one embodiment, the M is a positive integer no greater than maxNrofTCI-States, and the specific meaning of the maxNrofTCI-States can be found in 3GPP TS38.331.

In one embodiment, the M is a positive integer no greater than 64.

In one embodiment, the M is equal to 1, and the UE assumes that a transmission antenna port of the first radio signal and a transmission antenna port of any reference signal in a reference signal group indicated by the M piece(s) of sub-information are QCL.

In one embodiment, the M is equal to 1, and the first sub-information is the M piece of sub-information.

In one embodiment, the first information is transmitted via an air interface.

In one embodiment, the first information is transmitted by a serving cell added by the UE.

In one embodiment, the first information is carried by a higher-layer signaling.

In one embodiment, the first information is carried by a Radio Resource Control (RRC) signaling.

In one embodiment, the M piece(s) of sub-information is(are) respectively carried by M TCI-State IE(s), and the specific meaning of the TCI-State IE can be found in 3GPP TS38.331.

In one embodiment, the M piece(s) of sub-information indicates (respectively indicate) M TCI-StateId(s), and the specific meaning of the TCI-StateId can be found in 3GPP TS38.331.

In one embodiment, a reference signal group indicated by any of the M piece(s) of sub-information comprises 1 or 2 reference signals.

In one embodiment, a number of reference signal(s) comprised in a reference signal group indicated by any of the M piece(s) of sub-information is no greater than 2.

In one embodiment, all reference signals comprised in a reference signal group indicated by any of the M piece(s) of sub-information are transmitted by a same serving cell.

In one embodiment, all reference signals comprised in a reference signal group indicated by at least one of the M piece(s) of sub-information are transmitted by the first serving cell.

In one embodiment, any reference signal in a reference signal group indicated by any of the M piece(s) of sub-information is a Channel-State Information Reference Signal (CSI-RS) or a Synchronization Signal/Physical Broadcast Channel block(SS/PBCH block).

In one embodiment, at least one reference signal in a reference signal group indicated by at least one piece of sub-information in the M piece(s) of sub-information is a CSI-RS.

In one embodiment, at least one reference signal in a reference signal group indicated by at least one of the M piece(s) of sub-information is an SS/PBCH block.

In one embodiment, any of the M piece(s) of sub-information indicates a reference signal resource group, and a reference signal resource group comprises 1 or 2 reference signal resources.

In one subembodiment of the above embodiment, any reference signal resource in a reference signal resource group indicated by any of the M piece(s) sub-information is a CSI-RS resource or an SS/PBCH block resource.

In one subembodiment of the above embodiment, at least one reference signal resource in a reference signal resource group indicated by at least one of the M piece(s) of sub-information is a CSI-RS resource.

In one subembodiment of the above embodiment, at least one reference signal resource in a reference signal resource group indicated by at least one of the M piece(s) of sub-information is an SS/PBCH block resource.

In one embodiment, for any given sub-information of the M piece(s) of sub-information, all reference signal resources in a reference signal resource group indicated by the given sub-information are respectively reserved for all reference signals in a reference signal group indicated by the given sub-information.

In one embodiment, for any given sub-information in the M piece(s) of sub-information, all reference signals in a reference signal group indicated by the given sub-information are respectively transmitted on all reference signal resources in a reference signal resource group indicated by the given sub-information.

In one embodiment, any of the M piece(s) of sub-information indicates one or two second-type index(es), and the second-type index is an NZP-CSI-RS-ResourceId or an SSB-Index.

In one embodiment, at least one of the M piece(s) of sub-information indicates an NZP-CSI-RS-ResourceId.

In one embodiment, at least one of the M piece(s) of sub-information indicates two NZP-CSI-RS-ResourceIds.

In one embodiment, at least one of the M piece(s) of sub-information indicates an SSB-Index.

In one embodiment, at least one of the M piece(s) of sub-information indicates two SSB-Indexes.

In one embodiment, at least one of the M piece(s) of sub-information indicates an NZP-CSI-RS-ResourceId and an SSB-Index.

In one embodiment, the specific meaning of the NZP-CSI-RS-ResourceId can be found in 3GPP TS38.331.

In one embodiment, the specific meaning of the SSB-Index can be found in 3GPP TS38.331.

In one embodiment, for any of the M piece(s) of sub-information, a reference signal in a reference signal group indicated by the given sub-information is transmitted by the first serving cell, and the given sub-information indicates an index of the first serving cell.

In one embodiment, an index of the first serving cell is a CellIdentity.

In one embodiment, an index of the first serving cell is a PhysCellId.

In one embodiment, for any of the M piece(s) of sub-information, a reference signal in a reference signal group indicated by the given sub-information is transmitted by a second serving cell, the second serving cell is added by the UE, and the given sub-information indicates an index of the second serving cell.

In one embodiment, an index of the second serving cell is SCellIndex.

In one embodiment, an index of the second serving cell is ServCellIndex.

In one embodiment, the specific meaning of the QCL can be found in 3GPP TS38.211, section 4.4 and 3GPP TS38.214, section 5.1.5.

In one embodiment, the UE assumes that at least one transmission antenna port of the first radio signal and at least one transmitting antenna of any reference signal in the first reference signal group are QCL.

In one embodiment, the UE assumes that at least one transmission antenna port of a DeModulation Reference Signal (DMRS) on a physical-layer channel that carries the first radio signal and at least one transmission antenna port of any reference signal in the first reference signal group are QCL.

In one embodiment, the UE assumes that any transmission antenna port of the first radio signal and at least one transmission antenna port of any reference signal in the first reference signal group are QCL.

In one embodiment, the UE assumes that any transmission antenna port of a DMRS on a physical-layer channel that carries the first radio signal and at least one transmission antenna port of any reference signal in the first reference signal group are QCL.

In one embodiment, the UE assumes that any transmission antenna port of the first radio signal and any transmission antenna port of any reference signal in the first reference signal group are QCL.

In one embodiment, the UE assumes that any transmission antenna port of a DMRS on a physical-layer channel that carries the first radio signal and any transmission antenna port of any reference signal in the first reference signal group are QCL.

In one embodiment, for given sub-information in the M piece(s) of sub-information, a reference signal group indicated by the given sub-information only comprises one reference signal, the given sub-information indicates one QCL type, and the one QCL type is employed to the one reference signal.

In one embodiment, for given sub-information in the M piece(s) of sub-information, a reference signal group indicated by the given sub-information consists of two reference signals, the given sub-information indicates two QCL types, and the two QCL types are respectively employed to the two reference signals.

In one embodiment, the specific meaning of the QCL type can be found in 3GPP TS38.214, section 5.1.5.

In one embodiment, the first reference signal group consists of one reference signal.

In one embodiment, the first reference signal group consists of two reference signals.

In one embodiment, a reference signal in the first reference signal group is transmitted by the first serving cell.

In one embodiment, a reference signal in the first reference signal group is not transmitted by the first serving cell.

In one embodiment, a reference signal in the first reference signal group is transmitted by a second serving cell, and the second serving cell is added by the UE.

In one embodiment, the first time-frequency resource set comprises a positive integer number of Resource Element(s)(RE).

In one embodiment, the first radio signal is transmitted via an air interface.

In one embodiment, the first serving cell being not added by the UE comprises that the UE does not perform SCell addition on the first serving cell.

In one embodiment, the first serving cell being not added by the UE comprises that an sCellToAddModList latest received by the UE does not comprise the first serving cell.

In one embodiment, the first serving cell being not added by the UE comprises that an sCellToAddModList and an sCellToAddModListSCG latest received by the UE does not comprise the first serving cell.

In one embodiment, the first serving cell being not added by the UE comprises that the UE is not assigned an SCellIndex for the first serving cell.

In one embodiment, the SCellIndex is a positive integer no greater than 31.

In one embodiment, the first serving cell being not added by the UE comprises that the UE is not assigned an ServCellIndex for the first serving cell.

In one embodiment, the ServCellIndex is non-negative integer no greater than 31.

In one embodiment, the first serving cell being not added by the UE comprises that the first serving cell is not a Primary serving Cell (PCell) of the UE.

In one embodiment, the specific meaning of the sCellToAddModList can be found in 3GPP TS38.331.

In one embodiment, the specific meaning of the sCellToAddModListSCG can be found in 3GPP TS38.331.

In one embodiment, the specific meaning of the SCellIndex can be found in 3GPP TS38.331.

In one embodiment, the specific meaning of the ServCellIndex can be found in 3GPP TS38.331.

Embodiment 2

Figure 2:
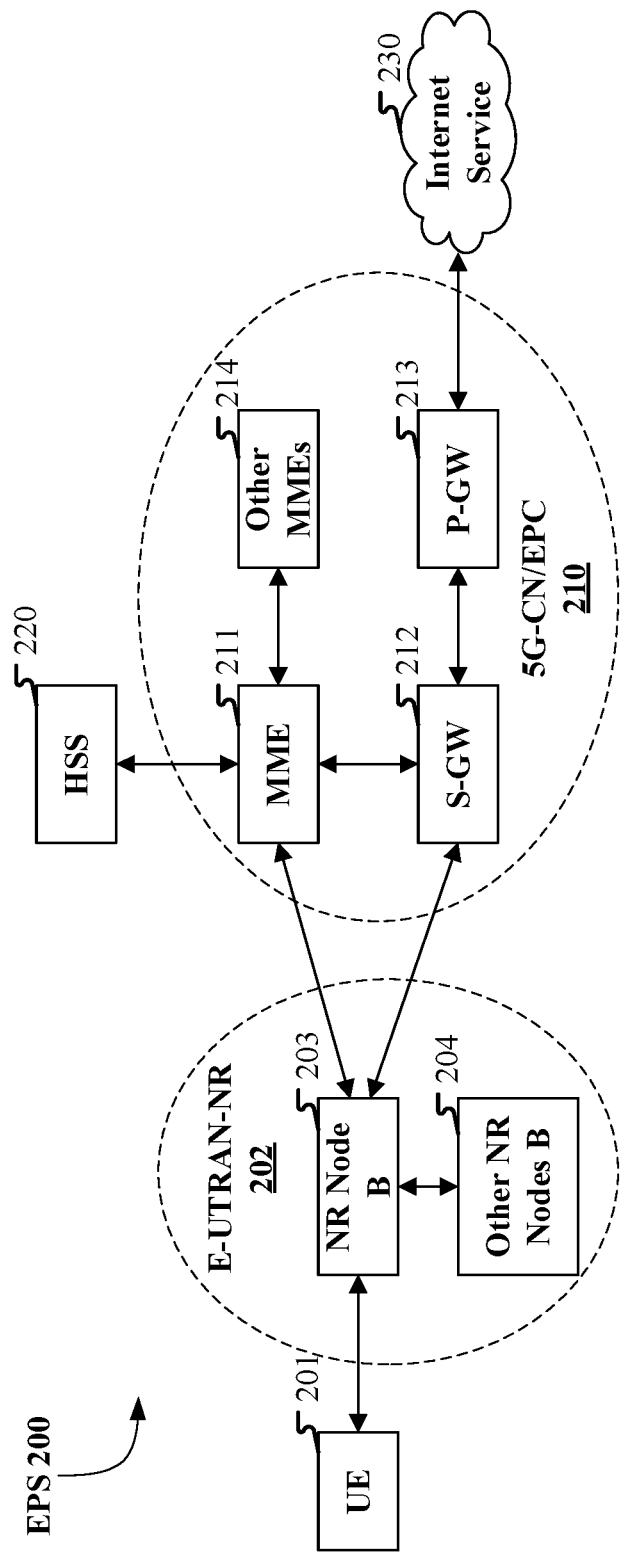
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and 5G systems network architecture 200 may be called an Evolved Packet System (EPS) 200. The EPS 200 may comprise one or more UEs 201, an E-UTRAN-NR 202, a 5G-Core Network/Evolved Packet Core (5G-CN/EPC) 210, a Home Subscriber Server (HSS) 220 and an Internet Service 230. Herein, UMTS refers to Universal Mobile Telecommunications System. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The E-UTRAN-NR 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrowband physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S interface. The 5G-CN/EPC 210 comprises an MME 211, other MMEs 214, a Service Gateway (S-GW) 212 and a Packet Date Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the gNB 203 corresponds to the first base station in the present disclosure.

In one embodiment, the gNB 204 corresponds to the second base station in the present disclosure.

In one embodiment, the UE 201 corresponds to the UE in the present disclosure.

In one embodiment, the gNB 203 supports multi-antenna-based wireless communications.

In one embodiment, the gNB 204 supports multi-antenna-based wireless communications.

In one embodiment, the UE 201 is a terminal that supports multi-antenna-based wireless communications.

Embodiment 3

Figure 3:
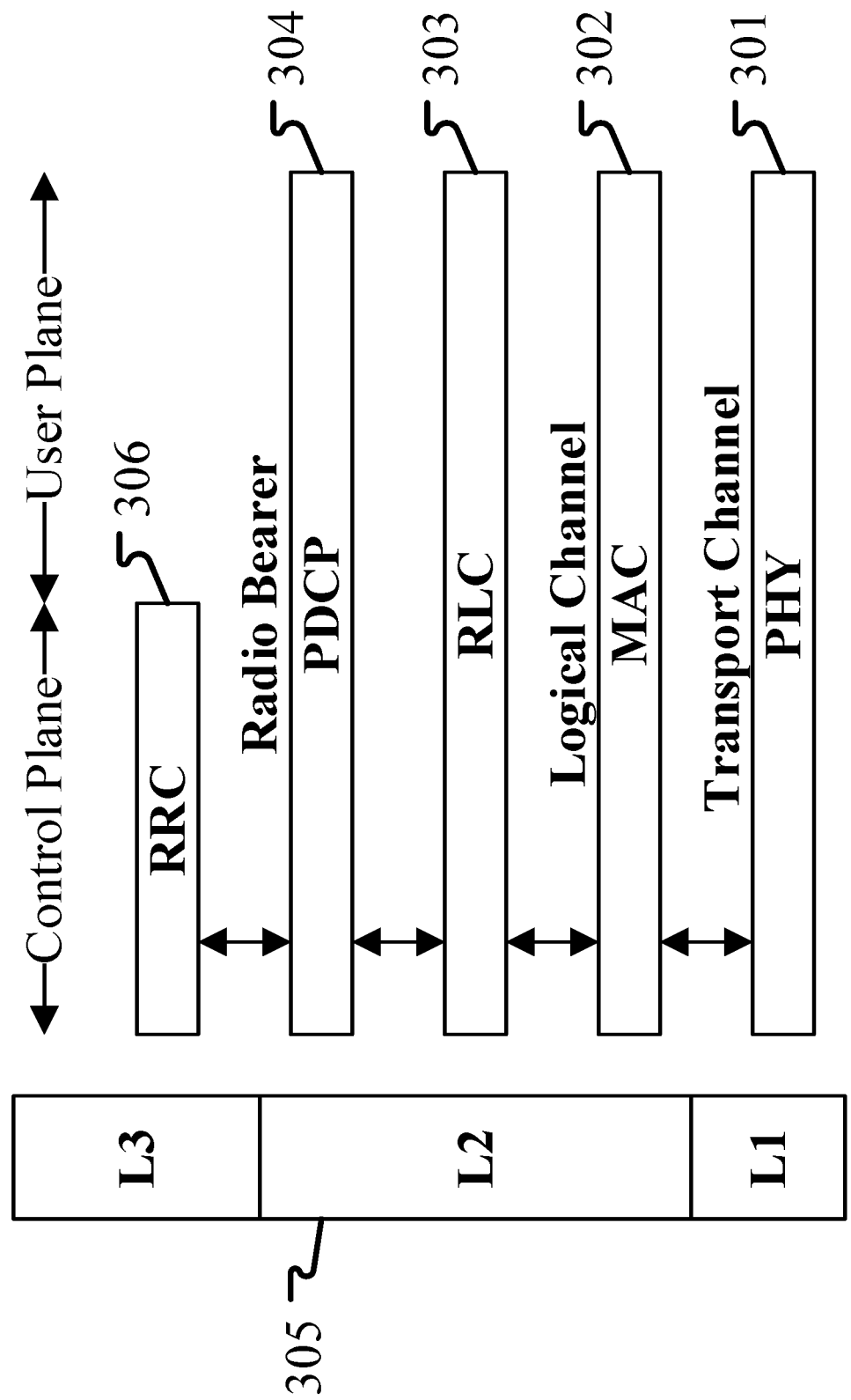
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the first base station in the present disclosure.

In one embodiment, the radio protocol architecture in FIG. 3 is applicable to the second base station in the present disclosure.

In one embodiment, the first information in the present disclosure is generated by the RRC sublayer 306.

In one embodiment, the first radio signal in the present disclosure is generated by the PHY 301.

In one embodiment, the N reference signal(s) in the present disclosure is(are) generated by the PHY 301.

In one embodiment, the N1 reference signal(s) in the present disclosure is(are) generated by the PHY 301.

In one embodiment, the N2 reference signal(s) in the present disclosure is(are) generated by the PHY 301.

In one embodiment, the second information in the present disclosure is generated by the PHY 301.

In one embodiment, the second radio signal in the present disclosure is generated by the PHY 301.

In one embodiment, the third information in the present disclosure is generated by the MAC sublayer 302.

In one embodiment, the third radio signal in the present disclosure is generated by the PHY 301.

In one embodiment, the first signaling in the present disclosure is generated by the PHY 301.

In one embodiment, the first signaling in the present disclosure is generated by the MAC sublayer 302.

In one embodiment, the fourth radio signal in the present disclosure is generated by the PHY 301.

In one embodiment, the fourth information in the present disclosure is generated by the RRC sublayer 306.

In one embodiment, the fourth information in the present disclosure is generated by the MAC sublayer 302.

In one embodiment, the fourth information in the present disclosure is generated by the PHY 301.

In one embodiment, the sixth information in the present disclosure is generated by the RRC sublayer 306.

In one embodiment, the sixth information in the present disclosure is generated by the PHY 301.

In one embodiment, the fifth information in the present disclosure is generated by the RRC sublayer 306.

In one embodiment, the fifth information in the present disclosure is generated by the MAC sublayer 302.

In one embodiment, the fifth information in the present disclosure is generated by the PHY 301.

Embodiment 4

Figure 4:
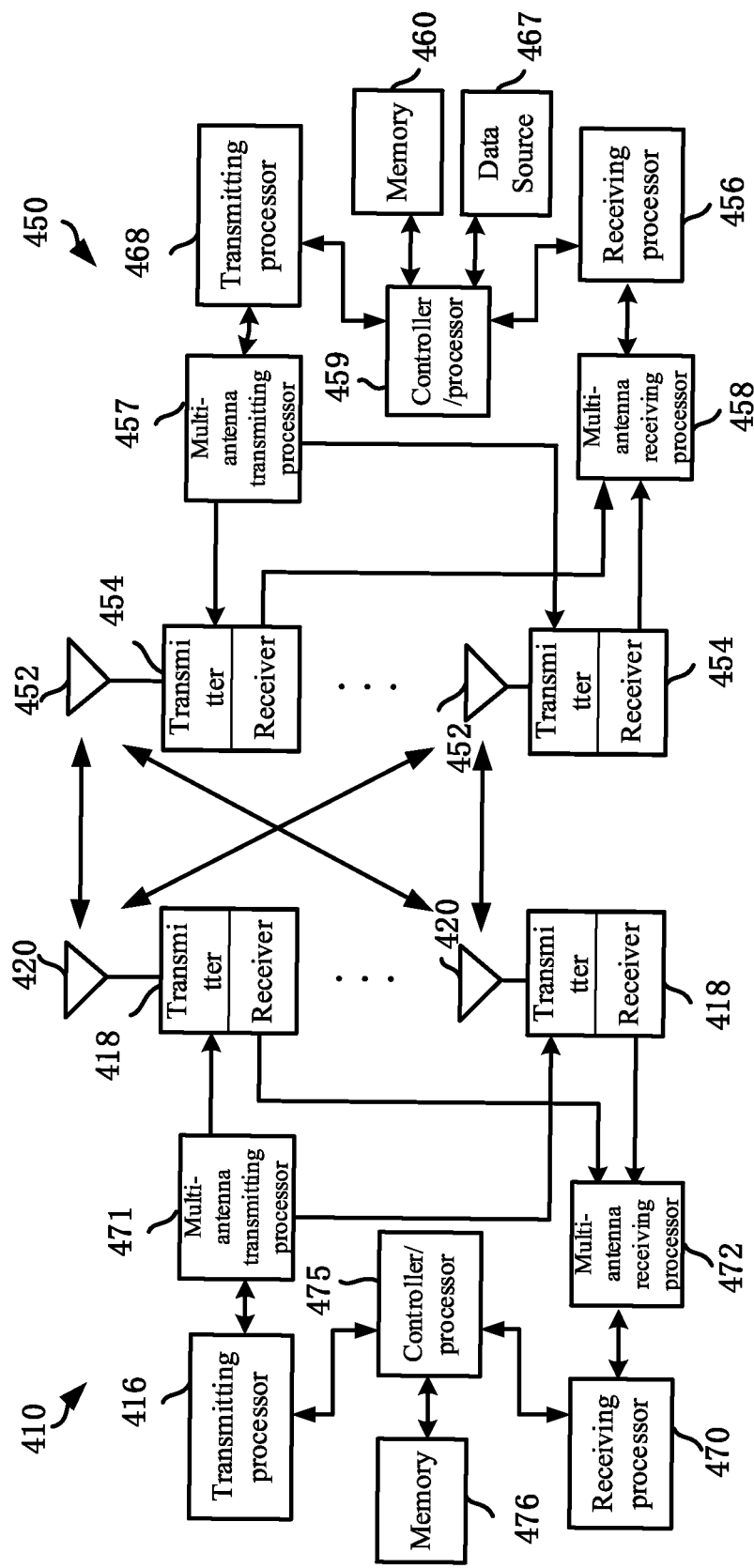
FIG. 4 illustrates a schematic diagram of an NR node and a UE according to one embodiment of the present disclosure.

Embodiment 4 illustrates a schematic diagram of a New Radio (NR) node and a UE, as shown in FIG. 4. FIG. 4 is a block diagram illustrating a UE 450 and a gNB 410 that are in communication with each other in access network.

The gNB 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In downlink (DL) transmission, at the gNB 410, a higher-layer packet from a core network is provided to the controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the UE 450 side, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In downlink (DL) transmission, at the UE 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any UE 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the gNB 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In uplink (UL) transmission, at the UE 450, the data source 467 is configured to provide a higher-layer packet to the controller/processor 459. The data source 467 represents all protocol layers above the L2 layer. Similar to a transmitting function of the gNB 410 described in DL transmission, the controller/processor 459 performs header compression, encryption, packet segmentation and reordering, and multiplexing between a logical channel and a transport channel based on radio resource allocation of the gNB 410 so as to provide the L2 layer functions used for the user plane and the control plane. The controller/processor 459 is also responsible for HARQ operation, retransmission of a lost packet, and a signaling to the gNB 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In uplink (UL) transmission, the function of the gNB 410 is similar to the receiving function of the UE 450 described in DL transmission. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In UL transmission, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network. The controller/processor 475 can also perform error detection using ACK and/or NACK protocols to support HARQ operation.

In one embodiment, the UE 450 comprises at least one processor and at least one memory. The at least one memory comprises computer program codes; the at least one memory and the computer program codes are configured to be used in collaboration with the at least one processor. The UE 450 at least receives the first information in the present disclosure; determines the first sub-information in the present disclosure out of the M piece(s) of sub-information in the present disclosure; and receives the first radio signal in the present disclosure in the first time-frequency resource set in the present disclosure. Herein, the first information comprises the M piece(s) of sub-information, each of the M piece(s) of sub-information indicates a reference signal group, and a reference signal group comprises at least one reference signal; the first sub-information indicates a first reference signal group; a reference signal in a reference signal group indicated by at least one of the M piece(s) of sub-information is transmitted by the first serving cell in the present disclosure, and the first serving cell is not added by the UE 450; the UE 450 assumes that a transmission antenna port of the first radio signal and a transmission antenna port of any reference signal in the first reference signal group are QCL, M being a positive integer.

In one embodiment, the UE 450 comprises a memory that stores a computer readable instruction program. The computer readable instruction program generates an action when executed by at least one processor. The action includes: receiving the first information in the present disclosure; determining the first sub-information in the present disclosure out of the M piece(s) of sub-information in the present disclosure; and receiving the first radio signal in the present disclosure in the first time-frequency resource set in the present disclosure. Herein, the first information comprises the M piece(s) of sub-information, each of the M piece(s) of sub-information indicates a reference signal group, and a reference signal group comprises at least one reference signal; the first sub-information indicates a first reference signal group; a reference signal in a reference signal group indicated by at least one of the M piece(s) of sub-information is transmitted by the first serving cell in the present disclosure, and the first serving cell is not added by the UE 450; the UE 450 assumes that a transmission antenna port of the first radio signal and a transmission antenna port of any reference signal in the first reference signal group are QCL, M being a positive integer.

In one embodiment, the gNB 410 comprises at least one processor and at least one memory. The at least one memory comprises computer program codes; the at least one memory and the computer program codes are configured to be used in collaboration with the at least one processor. The gNB 410 at least transmits the first information in the present disclosure; determines the first sub-information out of the M piece(s) of sub-information in the present disclosure; transmits the first radio signal in the present disclosure in the first time-frequency resource set in the present disclosure, wherein a reference signal in the first reference signal group is transmitted by a serving cell maintained by the gNB 410; or, drops transmission of the first radio signal in the first time-frequency resource set, wherein a reference signal in the first reference signal group is not transmitted by a serving cell maintained by the gNB 410. Herein, the first information comprises M piece(s) of sub-information, each of the M piece(s) of sub-information indicates a reference signal group, and a reference signal group comprises at least one reference signal; the first sub-information indicates a first reference signal group; a reference signal in a reference signal group indicated by at least one of the M piece(s) of sub-information is transmitted by the first serving cell in the present disclosure, and the first serving cell is not added by the a target receiver of the first radio signal; at least one serving cell maintained by the gNB 410 is added by a target receiver of the first radio signal; a target receiver of the first radio signal assumes that a transmission antenna port of the first radio signal and a transmission antenna port of any reference signal in the first reference signal group are QCL, M being a positive integer.

In one embodiment, the gNB 410 comprises a memory that stores a computer readable instruction program. The computer readable instruction program generates an action when executed by at least one processor. The action includes: transmitting the first information in the present disclosure; determining the first sub-information out of the M piece(s) of sub-information in the present disclosure; and transmitting the first radio signal in the present disclosure in the first time-frequency resource set in the present disclosure, wherein a reference signal in the first reference signal group is transmitted by a serving cell maintained by the gNB 410; or, dropping transmission of the first radio signal in the first time-frequency resource set, wherein a reference signal in the first reference signal group is not transmitted by a serving cell maintained by the gNB 410. Herein, the first information comprises M piece(s) of sub-information, each of the M piece(s) of sub-information indicates a reference signal group, and a reference signal group comprises at least one reference signal; the first sub-information indicates a first reference signal group; a reference signal in a reference signal group indicated by at least one of the M piece(s) of sub-information is transmitted by the first serving cell in the present disclosure, and the first serving cell is not added by the a target receiver of the first radio signal; at least one serving cell maintained by the gNB 410 is added by a target receiver of the first radio signal; a target receiver of the first radio signal assumes that a transmission antenna port of the first radio signal and a transmission antenna port of any reference signal in the first reference signal group are QCL, M being a positive integer.

In one embodiment, the gNB 410 comprises at least one processor and at least one memory. The at least one memory comprises computer program codes; the at least one memory and the computer program codes are configured to be used in collaboration with the at least one processor. The gNB 410 at least receives the fifth information in the present disclosure; transmits the first radio signal in the present disclosure in the first time-frequency resource set in the present disclosure; or, drops transmission of the first radio signal in the first time-frequency resource set. Herein, the fifth information indicates whether the gNB 410 transmits the first radio signal in the first time-frequency resource set, any serving cell maintained by the gNB 410 is not added by a target receiver of the first radio signal.

In one embodiment, the gNB 410 comprises a memory that stores a computer readable instruction program. The computer readable instruction program generates an action when executed by at least one processor. The action includes: receiving the fifth information in the present disclosure; transmitting the first radio signal in the present disclosure in the first time-frequency resource set in the present disclosure; or, dropping transmission of the first radio signal in the first time-frequency resource set. Herein, the fifth information indicates whether the gNB 410 transmits the first radio signal in the first time-frequency resource set, and any serving cell maintained by the gNB 410 is not added by a target receiver of the first radio signal.

In one embodiment, the gNB 410 corresponds to the first base station in the present disclosure.

In one embodiment, the gNB 410 corresponds to the second base station in the present disclosure.

In one embodiment, the UE 450 corresponds to the UE in the present disclosure.

In one embodiment, at least one of the antenna 452, the receiver 454, the receiving processor 456, the multi-antenna receiving processor 458, the controller/processor 459, the memory 460, or the data source 467 is used for receiving the first information in the present disclosure; at least one of the antenna 420, the transmitter 418, the transmitting processor 416, the multi-antenna transmitting processor 471, the controller/processor 475, or the memory 476 is used for transmitting the first information in the present disclosure.

In one embodiment, at least one of the antenna 452, the receiver 454, the receiving processor 456, the multi-antenna receiving processor 458, the controller/processor 459, the memory 460, or the data source 467 is used for determining the first sub-information out of the M piece(s) of sub-information in the present disclosure.

In one embodiment, at least one of the antenna 420, the receiver 418, the receiving processor 470, the multi-antenna receiving processor 472, the controller/processor 475, or the memory 476 is used for determining the first sub-information out of the M piece(s) of sub-information in the present disclosure.

In one embodiment, at least one of the antenna 452, the receiver 454, the receiving processor 456, the multi-antenna receiving processor 458, the controller/processor 459, the memory 460, or the data source 467 is used for receiving the first radio signal in the present disclosure in the first time-frequency resource set in the present disclosure; at least one of the antenna 420, the receiver 418, the receiving processor 416, the multi-antenna transmitting processor 471, the controller/processor 475, or the memory 476 is used for transmitting the first radio signal in the present disclosure in the first time-frequency resource set in the present disclosure.

In one embodiment, at least one of the antenna 452, the receiver 454, the receiving processor 456, the multi-antenna receiving processor 458, the controller/processor 459, the memory 460, or the data source 467 is used for receiving the N reference signal(s) in the present disclosure.

In one embodiment, at least one of the antenna 420, the transmitter 418, the transmitting processor 416, the multi-antenna transmitting processor 471, the controller/processor 475, or the memory 476 is used for transmitting the N1 reference signal(s) in the present disclosure.

In one embodiment, at least one of the antenna 420, the transmitter 418, the transmitting processor 416, the multi-antenna transmitting processor 471, the controller/processor 475, or the memory 476 is used for transmitting the N2 reference signal(s) in the present disclosure.

In one embodiment, at least one of the antenna 452, the receiver 454, the receiving processor 456, the multi-antenna receiving processor 458, the controller/processor 459, the memory 460, or the data source 467 is used for receiving the second information in the present disclosure on the first serving cell in the present disclosure; at least one of the antenna 420, the transmitter 418, the transmitting processor 416, the multi-antenna transmitting processor 471, the controller/processor 475, or the memory 476 is used for transmitting the second information in the present disclosure on the first serving cell in the present disclosure.

In one embodiment, at least one of the antenna 452, the receiver 454, the receiving processor 456, the multi-antenna receiving processor 458, the controller/processor 459, the memory 460, or the data source 467 is used for receiving the second radio signal in the present disclosure; at least one of the antenna 420, the transmitter 418, the transmitting processor 416, the multi-antenna transmitting processor 471, the controller/processor 475, or the memory 476 is used for transmitting the second radio signal in the present disclosure.

In one embodiment, at least one of the antenna 420, the receiver 418, the receiving processor 470, the multi-antenna receiving processor 472, the controller/processor 475, or the memory 476 is used for receiving the third radio signal in the present disclosure; at least one of the antenna 452, the transmitter 454, the transmitting processor 468, the multi-antenna transmitting processor 457, the controller/processor 459, the memory 460, or the data source 467 is used for transmitting the third radio signal in the present disclosure.

In one embodiment, at least one of the antenna 452, the receiver 454, the receiving processor 456, the multi-antenna receiving processor 458, the controller/processor 459, the memory 460, or the data source 467 is used for receiving the first signaling in the present disclosure; at least one of the antenna 420, the transmitter 418, the transmitting processor 416, the multi-antenna transmitting processor 471, the controller/processor 475, or the memory 476 is used for transmitting the first signaling in the present disclosure.

In one embodiment, at least one of the antenna 420, the receiver 418, the receiving processor 470, the multi-antenna receiving processor 472, the controller/processor 475, or the memory 476 is used for receiving the fourth radio signal in the present disclosure; at least one of the antenna 452, the transmitter 454, the transmitting processor 468, the multi-antenna transmitting processor 457, the controller/processor 459, the memory 460, or the data source 467 is used for transmitting the fourth radio signal in the present disclosure.

In one embodiment, at least one of the controller/processor 475 or the memory 476 is used for transmitting the fourth information in the present disclosure.

In one embodiment, at least one of the controller/processor 475 or the memory 476 is used for receiving the fourth information in the present disclosure.

In one embodiment, at least one of the controller/processor 475 or the memory 476 is used for transmitting the sixth information in the present disclosure.

In one embodiment, at least one of the controller/processor 475 or the memory 476 is used for receiving the sixth information in the present disclosure.

In one embodiment, at least one of the antenna 452, the transmitter 454, the transmitting processor 468, the multi-antenna transmitting processor 457, the controller/processor 459, the memory 460, or the data source 467 is used for transmitting the fifth information in the present disclosure.

In one embodiment, at least one of the controller/processor 475 or the memory 476 is used for transmitting the fifth information in the present disclosure.

In one embodiment, at least one of the antenna 420, the receiver 418, the receiving processor 470, the multi-antenna receiving processor 472, the controller/processor 475, or the memory 476 is used for receiving the fifth information in the present disclosure.

In one embodiment, at least one of the controller/processor 475 or the memory 476 is used for receiving the fifth information in the present disclosure.

Embodiment 5

Figure 5:
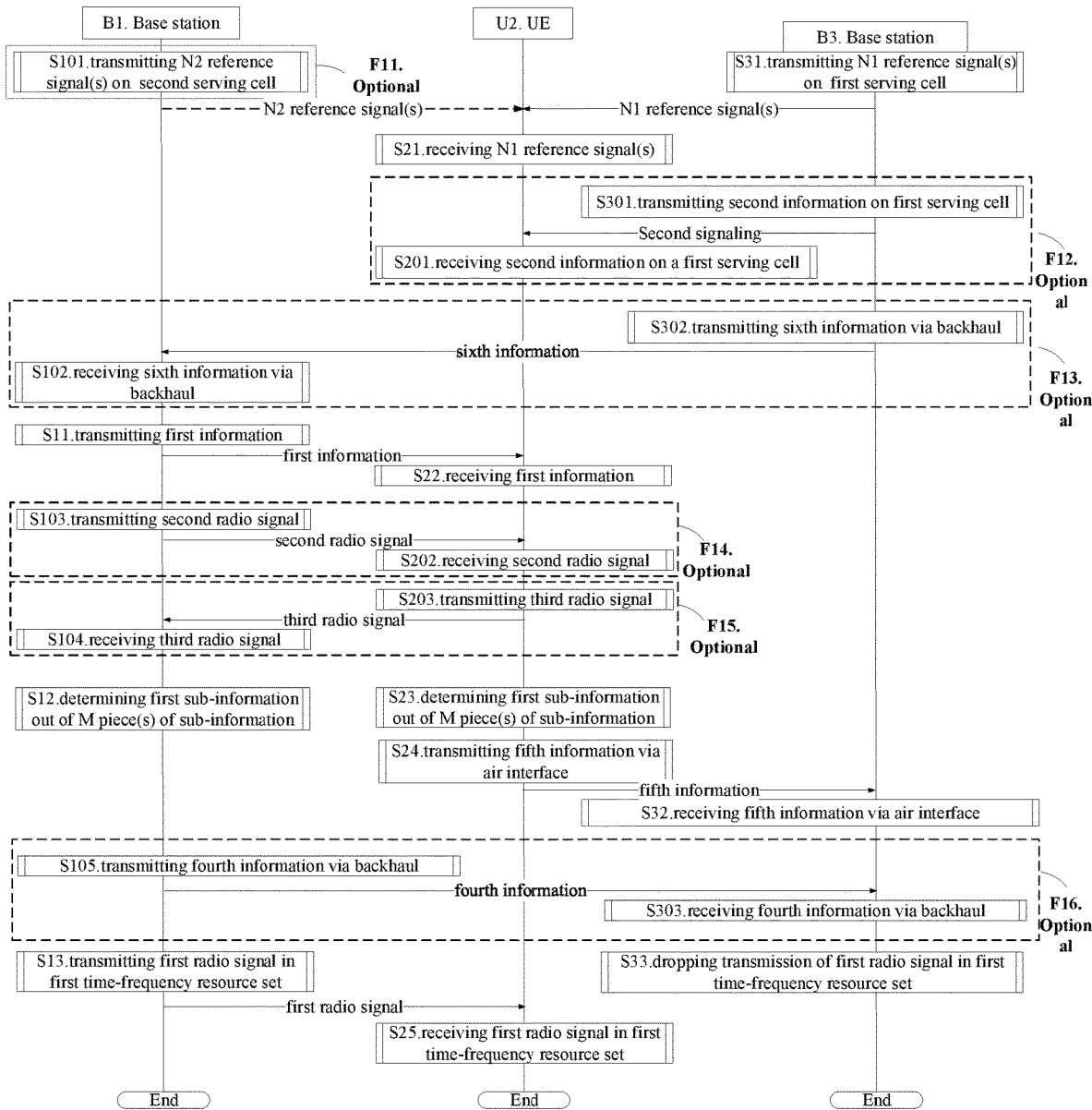
FIG. 5 illustrates a flowchart of transmission according to one embodiment of the present disclosure.

Embodiment 5 illustrates a flowchart of transmission, as shown in FIG. 5. In FIG. 5, the base station B1 is the first base station in the present disclosure, the base station B3 is the second base station in the present disclosure, and the UE U2 is the UE in the present disclosure. The base station B1 is a serving cell maintenance base station of the UE U2, and any serving cell maintained by the base station B3 is not added by the UE U2. In FIG. 5, steps in boxes F11 to F16 are respectively optional.

The B1 transmits N2 reference signal(s) on a second serving cell in step S101; receives sixth information via a backhaul in step S102; transmits first information in step S11; transmits a second radio signal in step S103; receives a third radio signal in step S104; determines first sub-information out of M piece(s) of sub-information in step S12; transmits fourth information via a backhaul in step S105; and transmits a first radio signal in a first time-frequency resource set in step S13.

The U2 receives N reference signal(s) in step S21; receives second information on a first serving cell in step S201; receives first information in step S22; receives second radio signal in step S202; transmits a third radio signal in step S203; determines first sub-information out of M piece(s) of sub-information in step S23; transmits fifth information via an air interface in step S24; and receives a first radio signal in a first time-frequency resource set in step S25.

The B3 transmits N1 reference signal(s) on a first serving cell in step S31; transmits second information on the first serving cell in step S301; transmits sixth information via a backhaul in step S302; receives fifth information via an air interface in step S32; receives fourth information via a backhaul in step S303; and drops transmission of a first radio signal in a first time-frequency resource set in step S33.

In Embodiment 5, the first information comprises the M piece(s) of sub-information, each of the M piece(s) of sub-information indicates a reference signal group, and a reference signal group comprises at least one reference signal; the first sub-information indicates a first reference signal group; the U2 assumes that a transmission antenna port of the first radio signal and a transmission antenna port of any reference signal in the first reference signal group are QCL, M being a positive integer. The N1 reference signal(s) is(are) reference signal(s) in the N reference signal(s) transmitted by the first serving cell; a reference signal in a reference signal group indicated by at least one of the M piece(s) of sub-information is a reference signal in the N1 reference signal(s), N being a positive integer, N1 being a positive integer no greater than the N. The first serving cell is not added by the U2. The second information indicates index(es) of the N1 reference signal(s) and an index of the first serving cell. A reference signal in the first reference signal group is transmitted by a serving cell maintained by the B1. At least one serving cell maintained by the B1 is added by the U2. The fifth information indicates that the B3 does not transmit the first radio signal in the first time-frequency resource set, and any serving cell maintained by the B3 is not added by the U2. The second radio signal carries third information, the third information being used for activating M1 piece(s) of sub-information out of the M piece(s) of sub-information, and the first sub-information is one of the M1 piece(s) of sub-information, M1 being a positive integer no greater than the M; the third radio signal is used for determining that the second radio signal is correctly received by the U2; and the N2 reference signal(s) is(are) reference signal(s) in the N reference signal(s) transmitted by the second serving cell; the B1 is a maintenance base station of the second serving cell, the second serving cell is added by the U2, N2 being a positive integer no greater than the N. The fourth information indicates the first time-frequency resource set; and the sixth information indicates index(es) of the N1 reference signal(s).

In one embodiment, the first serving cell is maintained by the B2.

In one embodiment, the first serving cell is not maintained by the first base station in the present disclosure.

In one embodiment, a reference signal in the first reference signal group is not transmitted by the first serving cell, and the first radio signal is not transmitted by the first serving cell.

In one embodiment, a reference signal in the first reference signal group is not transmitted by the first serving cell, and the first radio signal is not transmitted by the second base station in the present disclosure.

In one embodiment, a reference signal in the first reference signal group is not transmitted by a serving cell maintained by the second base station in the present disclosure, and the first radio signal is not transmitted by the second base station in the present disclosure.

In one embodiment, a reference signal in the first reference signal group is transmitted by the second serving cell, and the first radio signal is transmitted by the second serving cell.

In one embodiment, a reference signal in the first reference signal group is transmitted by the second serving cell, and the first base station in the present disclosure transmits the first radio signal in the first time-frequency resource set on the second serving cell.

In one embodiment, when all reference signals in the first reference signal group are transmitted by a serving cell maintained by the first base station in the present disclosure, and the first base station transmits the first radio signal in the first time-frequency resource set.

In one embodiment, the second base station in the present disclosure transmits radio signals to UEs other than a target receiver of the first radio signal in the first time-frequency resource set, and the other UEs add at least one serving cell maintained by the second base station.

In one embodiment, the second base station in the present disclosure drops transmission of the first radio signal in the first time-frequency resource set, and punctures in the first time-frequency resource set to avoid interfering wireless communications performed by other serving cells on a target receiver of the first radio signal.

In one embodiment, the second base station in the present disclosure drops transmission of the first radio signal in the first time-frequency resource set, and buffers data to be transmitted until the next opportunity for transmission.

In one embodiment, the second base station in the present disclosure drops transmission of the first radio signal in the first time-frequency resource set, and drops data to be transmitted.

In one embodiment, the first information is carried by a ControlResourceSet IE.

In one embodiment, the first information comprises part or all of information of a ControlResourceSet IE.

In one embodiment, the first information is carried by a PDCCH-Config IE.

In one embodiment, the first information comprises part or all of information of a PDCCH-Config IE.

In one embodiment, the first information is carried by a PDCCH-ConfigCommon IE.

In one embodiment, the first information comprises part or all of information in a PDCCH-ConfigCommon IE.

In one embodiment, the M piece(s) of sub-information is(are) carried by a tci-StatesPDCCH-ToAddList field in a ControlResourceSet IE.

In one embodiment, the M piece(s) of sub-information comprises(comprise) part or all of information in a tci-StatesPDCCH-ToAddList field in a ControlResourceSet IE.

In one embodiment, the specific meaning of the ControlResourceSet IE can be found in 3GPP TS38.331.

In one embodiment, the specific meaning of the PDCCH-Config IE can be found in 3GPP TS38.331.

In one embodiment, the specific meaning of the PDCCH-ConfigCommon IE can be found in 3GPP TS38.331.

In one embodiment, the specific meaning of the tci-StatesPDCCH-ToAddList can be found in 3GPP TS38.331.

In one embodiment, the first radio signal carries downlink control information.

In one embodiment, the first radio signal comprises a physical layer signaling.

In one embodiment, the first radio signal comprises a dynamic signaling.

In one embodiment, the first radio signal comprises a dynamic signaling for Downlink Grant.

In one embodiment, the first radio signal comprises Downlink Control Information (DCI).

In one embodiment, the first radio signal comprises DownLink Grant DCI.

In one embodiment, the first signaling comprises DCI identified by Cell Radio Network Temporary Identifier(C-RNTI).

In one embodiment, a Cyclic Redundancy Check of the first radio signal is scrambled by C-RNTI.

In one embodiment, the Nis greater than the N1.

In one embodiment, the N is greater than the N1, and at least one of the N reference signals not belonging to the N1 reference signal(s) is transmitted by the second serving cell.

In one embodiment, the N reference signal(s) is(are) transmitted on an air interface.

In one embodiment, a reference signal in a reference signal group indicated by at least one of the M piece(s) of sub-information is a reference signal in the N2 reference signal(s).

In one embodiment, a reference signal in a reference signal group indicated by at least one of the M piece(s) of sub-information is transmitted by the second serving cell.

In one embodiment, an index of the first serving cell is a CellIdentity.

In one embodiment, an index of the first serving cell is a PhysCellId.

In one embodiment, an index of the first serving cell consists of 10 bits.

In one embodiment, an index of the first serving cell consists of 9 bits.

In one embodiment, an index of the first serving cell consists of 28 bits.

In one embodiment, the second serving cell being added by a target receiver of the first radio signal comprises that a target receiver of the first radio signal performs SCell addition on the second serving cell.

In one embodiment, the second serving cell being added by a target receiver of the first radio signal comprises that an sCellToAddModList latest received by a target receiver of the first radio signal comprises the second serving cell.

In one embodiment, the second serving cell being added by a target receiver of the first radio signal comprises that an sCellToAddModList or an sCellToAddModListSCG latest received by a target receiver of the first radio signal comprises the second serving cell.

In one embodiment, the second serving cell being added by a target receiver of the first radio signal comprises that a target receiver of the first radio signal is assigned an SCellIndex for the second serving cell.

In one embodiment, the second serving cell being added by a target receiver of the first radio signal comprises that a target receiver of the first radio signal is assigned an ServCellIndex for the second serving cell.

In one embodiment, the second radio signal carries downlink data.

In one embodiment, the first base station in the present disclosure transmits the second radio signal on the second serving cell.

In one embodiment, the third information is carried by a MAC Protocol Data Unit (PDU) of the second radio signal.

In one embodiment, the M1 is equal to 1, and the first radio signal is transmitted on a downlink physical-layer control channel.

In one embodiment, the M1 is equal to 1, and the M1 piece(s) of sub-information consists(consist) of the first sub-information.

In one embodiment, the second radio signal is transmitted via an air interface.

In one embodiment, the second radio signal is transmitted by a third serving cell, and the third serving cell is maintained by the first base station in the present disclosure and added by the UE in the present disclosure.

In one embodiment, the third radio signal comprises a Hybrid Automatic Repeat reQuest ACKnowledgement (HARQ-ACK).

In one embodiment, the third radio signal indicates that the second radio signal is correctly received.

In one embodiment, the third radio signal is transmitted on an air interface.

In one embodiment, the third radio signal is transmitted on the second serving cell.

In one embodiment, the first radio signal is transmitted on a physical-layer control channel, and the first information indicates the first time-frequency resource set.

In one subembodiment of the above embodiment, the first information indicates an index of the first time-frequency resource set.

In one embodiment, an index of the first time-frequency resource set comprises a ControlResourceSetId.

In one embodiment, an index of the first time-frequency resource set comprises a SearchSpaceId.

In one embodiment, the specific meaning of the ControlResourceSetId can be found in 3GPP TS38.331.

In one embodiment, the specific meaning of the SearchSpaceId can be found in 3GPP TS38.331.

In one embodiment, the backhaul comprises an X2 interface.

In one embodiment, the backhaul comprises an S1 interface.

In one embodiment, the backhaul comprises an Xn interface.

In one embodiment, the sixth information indicates an index of the first serving cell.

In one embodiment, the second base station in the present disclosure receives the fifth information via an air interface.

In one embodiment, the U2 transmits a fourth radio signal; the fourth radio signal indicates a target reference signal out of K reference signal(s), at least one of the K reference signal(s) is transmitted by the first serving cell; the target reference signal is used for determining whether the first radio signal is transmitted by the first serving cell.

In one embodiment, the fourth radio signal carries the fifth information.

In one embodiment, the target reference signal is used for determining that the first radio signal is not transmitted by the first serving cell.

In one embodiment, a transmitter of the first radio signal is a transmitter of the target reference signal.

In one embodiment, when the target reference signal is transmitted by the first serving cell, the second base station in the present disclosure transmits the first radio signal in the first time-frequency resource set.

In one embodiment, when the target reference signal is not transmitted by any serving cell maintained by the second base station, the second base station in the present disclosure drops transmission of the first radio signal in the first time-frequency resource set.

In one embodiment, the fourth radio signal is transmitted via an air interface.

In one embodiment, the fourth radio signal is transmitted on the second serving cell.

In one embodiment, at least one of the K reference signal(s) is transmitted by the second serving cell.

In one embodiment, the first base station in the present disclosure receives the fourth radio signal via an air interface.

In one embodiment, a transmitter of a reference signal in the first reference signal group is a transmitter of the target reference signal.

In one embodiment, the fourth radio signal carries the fifth information; the first reference signal group comprises the target reference signal.

In one embodiment, the first radio signal is transmitted on a downlink physical-layer control channel (i.e., a downlink channel only capable of carrying a physical layer signaling).

In one embodiment, the downlink physical-layer control channel is a Physical Downlink Control CHannel (PDCCH).

In one embodiment, the downlink physical-layer control channel is a short PDCCH (sPDCCH).

In one embodiment, the downlink physical-layer control channel is a New Radio PDCCH (NR-PDCCH).

In one embodiment, the downlink physical-layer control channel is a Narrow Band PDCCH (NB-PDCCH).

In one embodiment, the first information is transmitted on a downlink physical layer data channel (i.e., a downlink channel capable of carrying physical layer data).

In one embodiment, the second radio signal is transmitted on a downlink physical layer data channel (i.e., a downlink channel capable of carrying physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH(NR-PDSCH).

In one embodiment, the downlink physical layer data channel is a Narrow Band PDSCH (NB-PDSCH).

In one embodiment, the third radio signal is transmitted on an uplink physical layer data channel (i.e., an uplink channel capable of carrying physical layer data).

In one embodiment, the uplink physical layer data channel is a Physical Uplink Shared CHannel (PUSCH).

In one subembodiment, the uplink physical layer data channel is a short PUSCH (sPUSCH).

In one embodiment, the uplink physical layer data channel is a New Radio PUSCH (NR-PUSCH).

In one embodiment, the uplink physical layer data channel is a Narrow Band PUSCH (NB-PUSCH).

In one embodiment, the third radio signal is transmitted on an uplink physical-layer control channel (i.e., an uplink channel only capable of carrying a physical layer signaling).

In one embodiment, the uplink physical-layer control channel is a Physical Uplink Control CHannel (PUCCH).

In one embodiment, the uplink physical-layer control channel is a short PUCCH (sPUCCH).

In one embodiment, the uplink physical-layer control channel is a New Radio PUCCH (NR-PUCCH).

In one embodiment, the uplink physical-layer control channel is a Narrow Band PUCCH (NB-PUCCH).

Embodiment 6

Figure 6:
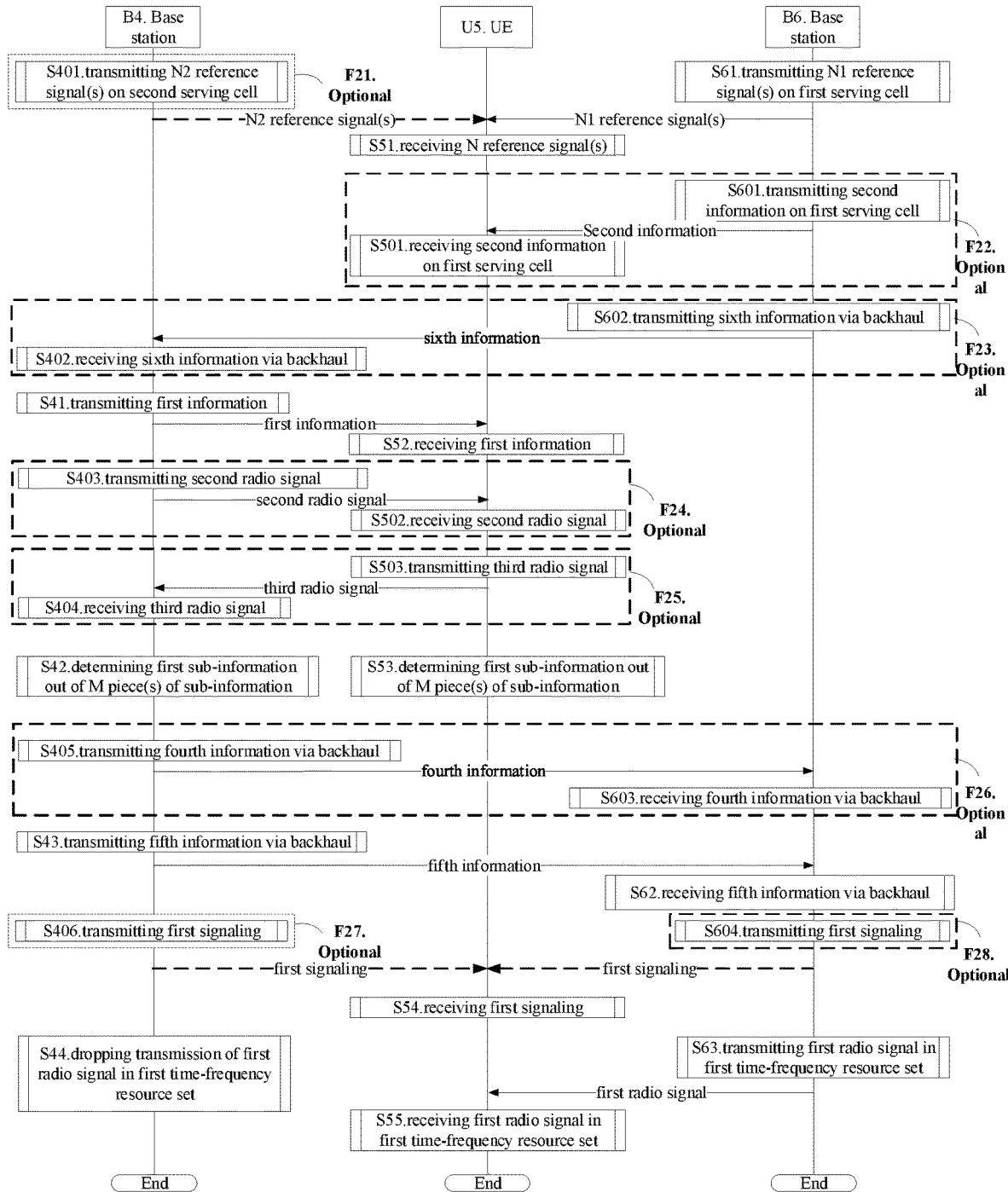
FIG. 6 illustrates a flowchart of transmission according to one embodiment of the present disclosure.

Embodiment 6 illustrates a flowchart of transmission, as shown in FIG. 6. In FIG. 6, the base station B4 is the first base station in the present disclosure, the base station B6 is the second base station in the present disclosure, and the UE U5 is the UE in the present disclosure. The base station B4 is a serving cell maintenance base station of the UE U5, and any serving cell maintained by the base station B6 is not added by the UE U5. In FIG. 6, steps in box F21 to F28 are respectively optional, wherein there exists only one step in box F27 and box F28.

For the B4, steps S401 to S405 are the same as steps S101 to S105 in Embodiment 5; steps S41 and S42 are respectively the same with steps S11 and S12 in Embodiment 5; transmits fifth information via a backhaul in step S43; transmits a first signaling in step S406; and drops transmission of a first radio signal in a first time-frequency resource set in step S44.

For the U5, steps S51 to S53 are the same as steps S21 to S23 in Embodiment 5; steps S501 to S503 are respectively the same with steps S201 to S203 in Embodiment 5; receives a first signaling in step S54; and receives a first radio signal in a first time-frequency resource set in step S55.

For the B6, step S61 is the same as step S31 in Embodiment 5, steps S601 to S603 are respectively the same with steps S301 to S303 in Embodiment 5; receives fifth information via a backhaul in step S62, transmits a first signaling in step S604, and transmits a first radio signal in a first time-frequency resource set in step S63.

In Embodiment 6, a reference signal in the first reference signal group is transmitted by a serving cell maintained by the B6. The fifth information indicates that the B6 transmits the first radio signal in the first time-frequency resource set. The first radio signal is transmitted on a physical-layer data channel, and the first signaling comprises scheduling information of the first radio signal; and the first signaling indicates the first sub-information.

In one embodiment, a reference signal in the first reference signal group is transmitted by the first serving cell, and the first radio signal is transmitted by the first serving cell.

In one embodiment, when all reference signals in the first reference signal group are not transmitted by a serving cell maintained by the first base station in the present disclosure, and the first base station in the present disclosure drops transmission of the first radio signal in the first time-frequency resource set.

In one embodiment, the first base station in the present disclosure drops transmission of the first radio signal in the first time-frequency resource set, the first base station in the present disclosure transits radio signals to UEs other than a target receiver of the first radio signal in the first time-frequency resource set, and other UEs add at least one serving cell maintained by the first base station in the present disclosure.

In one embodiment, the first base station in the present disclosure drops transmission of the first radio signal in the first time-frequency resource set, and punctures in the first time-frequency resource set to avoid interfering wireless communications performed by other serving cells on a target receiver of the first radio signal.

In one embodiment, the first base station in the present disclosure drops transmission of the first radio signal in the first time-frequency resource set, and buffers data to be transmitted until the next opportunity for transmission.

In one embodiment, the first base station in the present disclosure drops transmission of the first radio signal in the first time-frequency resource set, and drops data to be transmitted.

In one embodiment, the first information is carried by a PDSCH-Config Information Element (IE).

In one embodiment, the first information comprises part or all of information in a PDSCH-Config IE.

In one embodiment, the M piece(s) of sub-information is(are) carried by a tci-StatesToAddModList field in a PDSCH-Config IE.

In one embodiment, the M piece(s) of sub-information comprises(comprise) part or all of information in a tci-StatesToAddModList field in a PDSCH-Config IE.

In one embodiment, the specific meaning of the PDSCH-Config IE can be found in 3GPP TS38.331.

In one embodiment, the specific meaning of the tci-StatesToAddModList field can be found in 3GPP TS38.331.

In one embodiment, the first radio signal carries downlink data.

In one embodiment, the M1 is no greater than 8, and the first radio signal is transmitted on a downlink physical-layer data channel.

In one embodiment, the first signaling is transmitted via an air interface.

In one embodiment, the scheduling information of the first radio signal includes at least one of occupied time-domain resources, occupied frequency-domain resources, a Modulation and Coding Scheme (MCS), configuration information of a DeModulation Reference Signal (DMRS), a Hybrid Automatic Repeat reQuest (HARQ) process number, a Redundancy Version (RV), a New Data Indicator (NDI), corresponding Spatial Transmit (Tx) parameters, or corresponding Spatial Rx parameters.

In one embodiment, configuration information of a DMRS includes one or more of occupied time-domain resources, occupied frequency-domain resources, occupied code-domain resources, an RS sequence, a mapping mode, a DMRS type, cyclic shift, and an Orthogonal Cover Code (OCC).

In one embodiment, the first base station in the present disclosure transmits the first radio signal in the first time-frequency resource set, and the first base station in the present disclosure transmits the first signaling.

In one embodiment, the second base station in the present disclosure transmits the first radio signal in the first time-frequency resource set, and the first base station in the present disclosure transmits the first signaling.

In one embodiment, the second base station in the present disclosure transmits the first radio signal in the first time-frequency resource set, and the second base station in the present disclosure transmits the first signaling.

In one embodiment, the second base station in the present disclosure receives the fifth information via a backhaul.

In one embodiment, the fifth information is carried by the fourth information.

In one embodiment, the fourth information indicates whether the second base station in the present disclosure transmits the first radio signal in the first time-frequency resource set.

In one embodiment, the first radio signal is transmitted on a downlink physical layer data channel (i.e., a downlink channel capable of carrying physical layer data).

In one embodiment, the downlink physical layer data channel is a PDSCH.

In one embodiment, the downlink physical layer data channel is a sPDSCH.

In one embodiment, the downlink physical layer data channel is an NR-PDSCH.

In one embodiment, the downlink physical layer data channel is an NB-PDSCH.

In one embodiment, a transmission channel corresponding to the first radio signal is a Downlink Shared Channel (DL-SCH).

Embodiment 7

Figure 7:
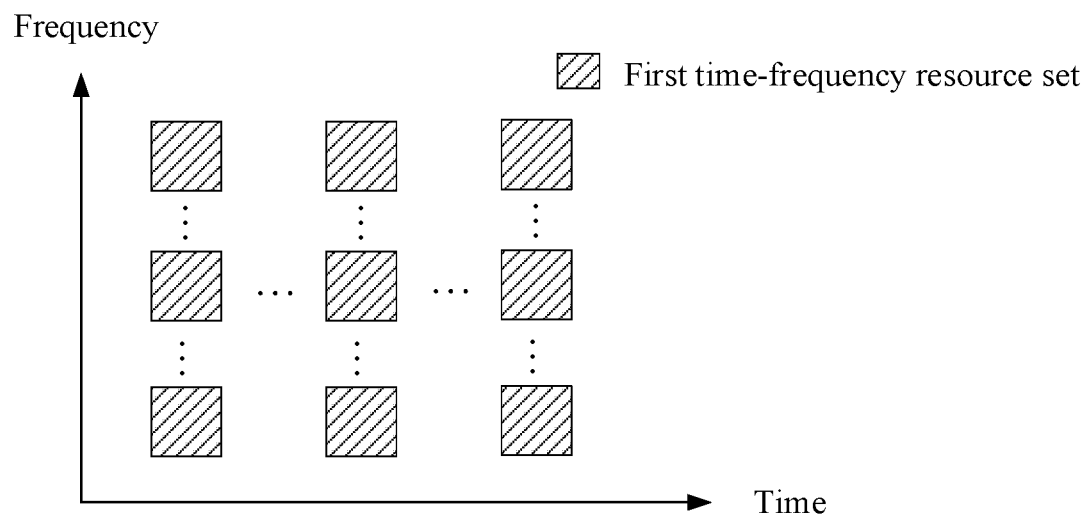
FIG. 7 illustrates a schematic diagram of resource mapping of a first time-frequency resource set in time-frequency domain according to one embodiment of the present disclosure.

Embodiment 7 illustrates a schematic diagram of resource mapping of a first time-frequency resource set in time-frequency domain, as shown in FIG. 7.

In Embodiment 7, the UE in the present disclosure receives the first radio signal in the present disclosure in the first time-frequency resource set, and the first radio signal is transmitted on a downlink physical-layer control channel. In FIG. 7, the left-slash-filled box represents the first time-frequency resource set.

In one embodiment, the first time-frequency resource set comprises a positive integer number of Resource Element(s)(RE).

In one embodiment, an RE occupies a multicarrier symbol in time domain, and a subcarrier in frequency domain.

In one embodiment, the first time-frequency resource set is a COntrol REsource SET (CORESET).

In one embodiment, the first time-frequency resource set is a search space.

In one embodiment, the first time-frequency resource set occupies a positive integer number of inconsecutive subcarriers in frequency domain.

In one embodiment, the first time-frequency resource set occupies a positive integer number of inconsecutive multicarrier symbols in time domain.

In one embodiment, the first time-frequency resource set occurs multiple times in time domain.

In one subembodiment of the above embodiment, time intervals between any two adjacent occurrences of the first time-frequency resource set in time domain are equal.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the first time-frequency resource set is configured by a serving cell added by the UE through a ControlResourceSet IE.

In one embodiment, the first time-frequency resource set is configured by a serving cell added by the UE through a PDCCH-Config IE.

In one embodiment, the first time-frequency resource set is configured by a serving cell added by the UE through a PDCCH-ConfigCommon IE.

In one embodiment, the first time-frequency resource set is configured by a serving cell added by the UE through a SearchSpace IE.

In one embodiment, the specific meaning of the SearchSpace IE can be found in 3GPP TS38.331.

In one embodiment, the first time-frequency resource set occupies frequency resources on a target serving cell, and a reference signal in the first reference signal group in the present disclosure is transmitted by the target serving cell.

In one embodiment, the first time-frequency resource set occupies frequency resources on the second serving cell.

Embodiment 8

Figure 8:
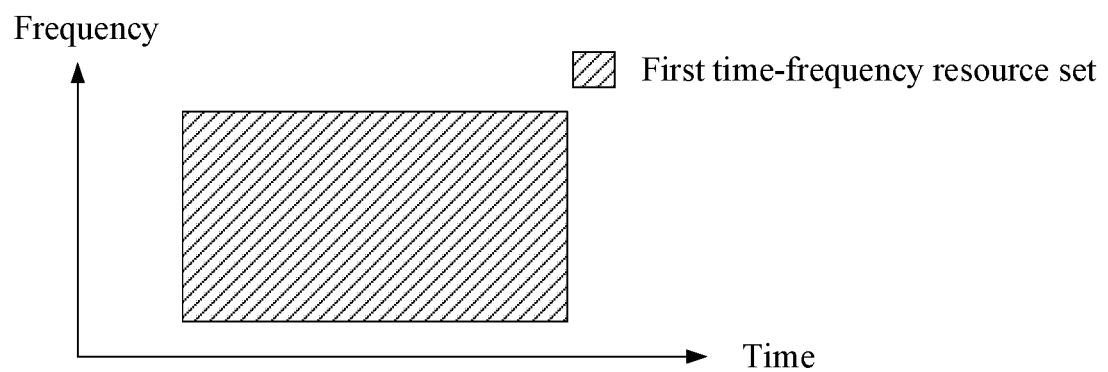
FIG. 8 illustrates a schematic diagram of resource mapping of a first time-frequency resource set in time-frequency domain according to one embodiment of the present disclosure.

Embodiment 8 illustrates a schematic diagram of resource mapping of a first time-frequency resource set in time-frequency domain, as shown in FIG. 8.

In Embodiment 8, the UE in the present disclosure receives the first radio signal in the present disclosure in the first time-frequency resource set, and the first radio signal is transmitted on a downlink physical-layer data channel. In FIG. 8, the left-slash-filled box represents the first time-frequency resource set.

In one embodiment, the first time-frequency resource set occupies a positive integer number of consecutive subcarriers in frequency domain.

In one embodiment, the first time-frequency resource set occupies a positive integer number of consecutive multicarrier symbols in time domain.

In one embodiment, the first signaling in the present disclosure indicates the first time-frequency resource set.

Embodiment 9

Figure 9:
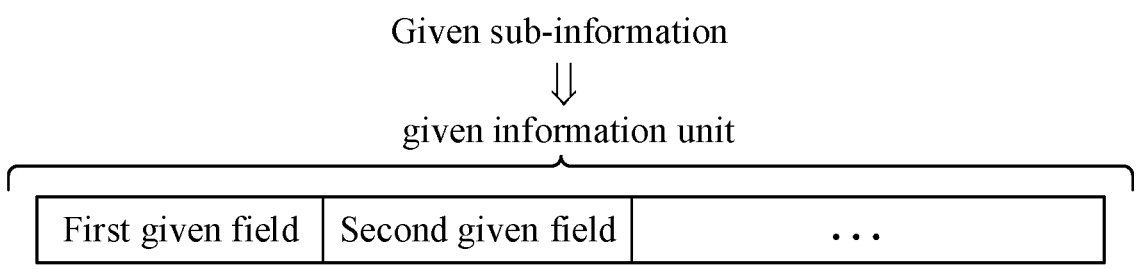
FIG. 9 illustrates a schematic diagram of one piece of given sub-information in M piece(s) of sub-information according to one embodiment of the present disclosure.

Embodiment 9 illustrates a schematic diagram of one piece of given sub-information in M piece(s) of sub-information, as shown in FIG. 9.

In Embodiment 9, a reference signal group indicated by one piece of given sub-information in the M piece(s) of sub-information only comprises a third reference signal. The given sub-information indicates a given information unit, and the given information unit comprises a first given field and a second given field. The first given field in the given information unit indicates an index of the given information unit, the second given field in the given information unit indicates the third reference signal.

In one embodiment, any of the M piece(s) of sub-information indicates an information unit, and the information unit is a TCI-State IE.

In one embodiment, any of the M piece(s) of sub-information indicates an information unit, and the information unit comprises part or all of information in a TCI-State IE.

In one embodiment, the first given field in the given information unit comprises part or all of information in a tci-StateId field in a TCI-State IE.

In one embodiment, the first given field in the given information unit indicates a TCI-StateId.

In one embodiment, the second given field in the given information unit comprises part or all of information in a qcl-Type1 field in a TCI-State IE.

In one embodiment, the second given field in the given information unit indicates QCL-Info.

In one embodiment, the second given field in the given information unit comprises a first given sub-field and a second given sub-field, the first given sub-field in the second given field in the given information unit indicates an index of the third reference signal, and the second given sub-field in the second given field in the given information unit indicates a QCL type corresponding to the third reference signal.

In one subembodiment of the above embodiment, an index of the third reference signal is NZP-CSI-RS-ResourceId or SSB-Index.

In one subembodiment of the above embodiment, a QCL type corresponding to the third reference signal is one of QCL-TypeA, QCL-TypeB, QCL-TypeC or QCL-TypeD.

In one subembodiment of the above embodiment, the first given sub-field in the second given field in the given information unit comprises part or all of information in a referenceSignal field in a TCI-State IE.

In one subembodiment of the above embodiment, the second given sub-field in the second given field in the given information unit comprises part or all of information in a qcl-Type field in a TCI-State IE.

In one embodiment, the second given field in the given information unit comprises a fifth given subfield; the fifth given subfield in the second given field in the given information unit indicates an index of a transmitter of the third reference signal.

In one subembodiment of the above embodiment, the third reference signal is transmitted by the second serving cell in the present disclosure, and the fifth given subfield in the second given field in the given information unit indicates a SCellIndex of the second serving cell.

In one subembodiment of the above embodiment, the third reference signal is transmitted by the second serving cell in the present disclosure, and the fifth given subfield in the second given field in the given information unit indicates a ServCellIndex of the second serving cell.

In one subembodiment of the above embodiment, the third reference signal is transmitted by the first serving cell in the present disclosure, and the fifth given subfield in the second given field in the given information unit indicates a CellIdentity of the first serving cell.

In one subembodiment of the above embodiment, the third reference signal is transmitted by the first serving cell in the present disclosure, and the fifth given subfield in the second given field in the given information unit indicates a PhysCellId of the first serving cell.

In one embodiment, the second given field in the given information unit comprises a seventh given subfield and an eighth given subfield; the seventh given subfield in the second given field in the given information unit comprises part or all or information in a cell field in a TCI-State IE, and the eighth given sub-field in the second given field in the given information unit comprises part or all of information in a bwp-Id field in a TCI-State IE; and specific meanings of the cell field and the bwp-Id field can be found in 3GPP TS38.331.

In one embodiment, the specific meaning of the TCI-State IE can be found in 3GPP TS38.331.

In one embodiment, the specific meaning of the tci-StateId can be found in 3GPP TS38.331.

In one embodiment, the specific meaning of the TCI-StateId can be found in 3GPP TS38.331.

In one embodiment, the specific meaning of the qcl-Type1 can be found in 3GPP TS38.331.

In one embodiment, the specific meaning of the QCL-Info can be found in 3GPP TS38.331.

In one embodiment, the specific meaning of the referenceSignal can be found in 3GPP TS38.331.

In one embodiment, the specific meaning of the qcl-Type can be found in 3GPP TS38.331.

Embodiment 10

Figure 10:
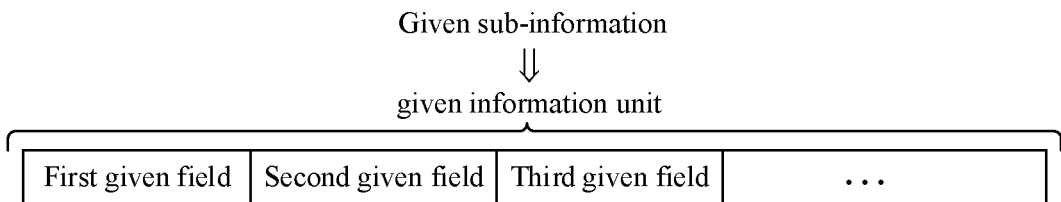
FIG. 10 illustrates a schematic diagram of one piece of given sub-information in M piece(s) of sub-information according to one embodiment of the present disclosure.

Embodiment 10 illustrates a schematic diagram of one piece of given sub-information in M piece(s) of sub-information, as shown in FIG. 10.

In Embodiment 10, a reference signal group indicated by one piece of given sub-information in the M piece(s) of sub-information consists of a third reference signal and a fourth reference signal. The given sub-information indicates a given information unit, the given information unit comprises a first given field, a second given field and a third given field. The first given field in the given information unit indicates an index of the given information unit, the second given field in the given information unit indicates the third reference signal, the third given field in the given information unit indicates the fourth reference signal.

In one embodiment, the third given field in the given information unit comprises part or all of information in a qcl-Type2 field in a TCI-State IE.

In one embodiment, the third given field in the given information unit indicates QCL-Info.

In one embodiment, the third given field in the given information unit comprises a third given subfield and a fourth given subfield; the third given subfield in the third given field in the given information unit indicates an index of the fourth reference signal, and the fourth given subfield in the third given field in the given information unit indicates a QCL type corresponding to the fourth reference signal.

In one subembodiment of the above embodiment, an index of the fourth reference signal is NZP-CSI-RS-ResourceId or SSB-Index.

In one subembodiment of the above embodiment, a QCL type corresponding to the fourth reference signal is one of QCL-TypeA, QCL-TypeB, QCL-TypeC or QCL-TypeD.

In one subembodiment of the above embodiment, the third given sub-field in the third given field in the given information unit comprises part or all of information in a referenceSignal field in a TCI-State IE.

In one subembodiment of the above embodiment, the fourth given sub-field in the third given field in the given information unit comprises part or all of information in a qcl-Type field in a TCI-State IE.

In one embodiment, the third given field in the given information unit comprises a sixth given subfield; the sixth given subfield in the third given field in the given information unit indicates an index of a transmitter of the fourth reference signal.

In one subembodiment of the above embodiment, the fourth reference signal is transmitted by the second serving cell in the present disclosure, and the sixth given subfield in the third given field in the given information unit indicates a SCellIndex of the second serving cell.

In one subembodiment of the above embodiment, the fourth reference signal is transmitted by the second serving cell in the present disclosure, and the sixth given subfield in the third given field in the given information unit indicates a ServCellIndex of the second serving cell.

In one subembodiment of the above embodiment, the fourth reference signal is transmitted by the first serving cell in the present disclosure, and the sixth given subfield in the third given field in the given information unit indicates a CellIdentity of the first serving cell.

In one subembodiment of the above embodiment, the fourth reference signal is transmitted by the first serving cell in the present disclosure, and the sixth given subfield in the third given field in the given information unit indicates a PhysCellId of the first serving cell.

In one embodiment, the specific meaning of the qcl-Type2 can be found in 3GPP TS38.331.

Embodiment 11

Figure 11:
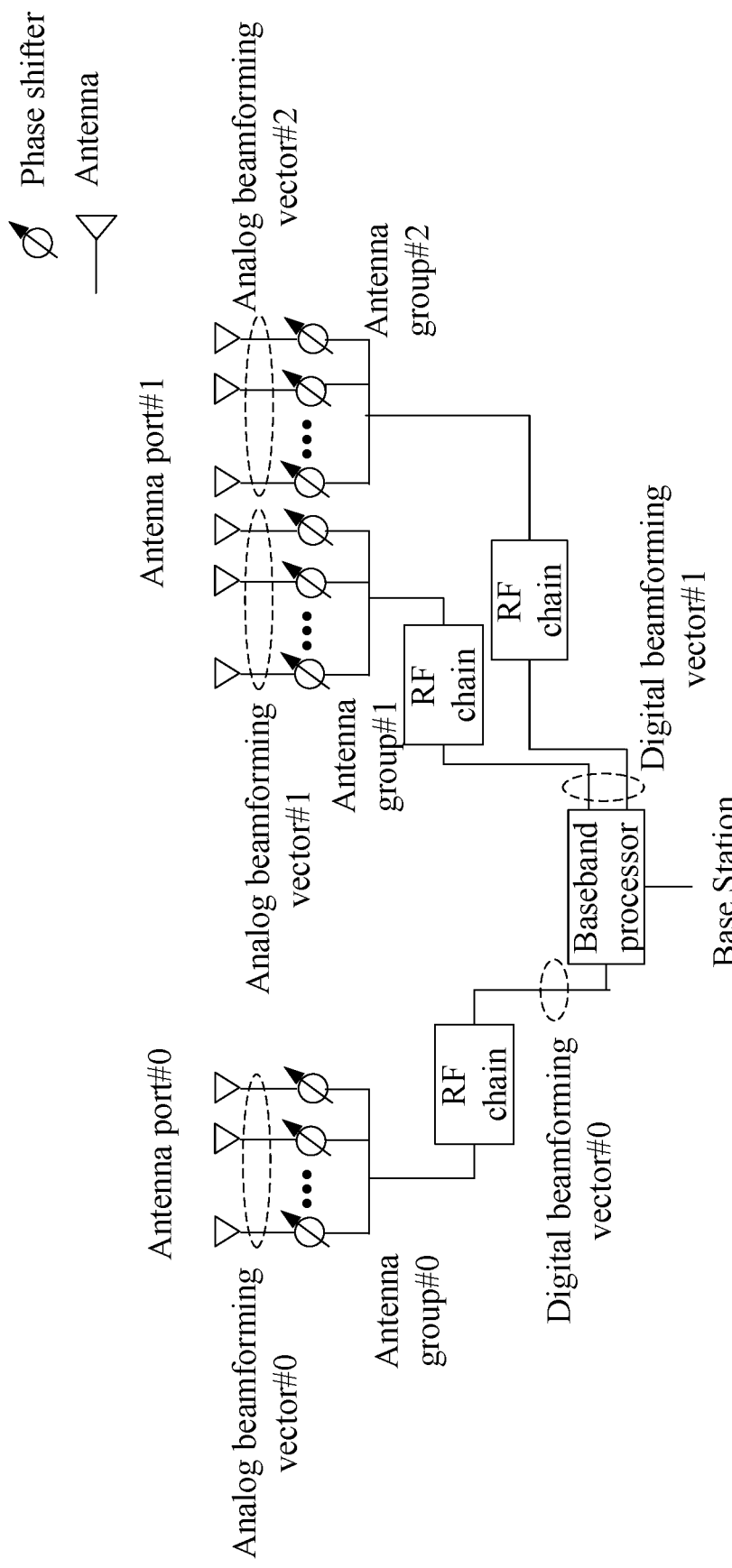
FIG. 11 illustrates a schematic diagram of antenna ports according to one embodiment of the present disclosure.

Embodiment 11 illustrates a schematic diagram of antenna ports; as shown in FIG. 11.

In Embodiment 11, one antenna port is formed by superposition of antennas of a positive integer number of antenna group(s) through antenna virtualization; an antenna group comprises a positive integer number of antenna(s). An antenna group is connected to a baseband processor via a Radio Frequency (RF) chain, and different antenna groups correspond to different RF chains. Mapping coefficients from all antennas of a positive integer number of antenna group(s) comprised in a given antenna port to the given antenna port constitute a beamforming vector corresponding to the given antenna port. Mapping coefficients from multiple antennas comprised in any given antenna group within a positive integer number of antenna group(s) comprised in the given antenna port to the given antenna port constitute an analog beamforming vector of the given antenna group. Analog beamforming vectors corresponding to the positive integer number of antenna group(s) comprised in the given antenna port are arranged diagonally to form an analog beamforming matrix corresponding to the given antenna port. Mapping coefficients from the positive integer number of antenna group(s) comprised in the given antenna port to the given antenna port constitute a digital beamforming vector corresponding to the given antenna port. A beamforming vector corresponding to the given antenna port is acquired as a product of the analog beamforming matrix and the digital beamforming vector corresponding to the given antenna port.

FIG. 11 illustrates two antenna ports, namely, antenna port #0 and antenna port #1. Herein, the antenna port #0 consists of antenna group #0, and the antenna port #1 consists of antenna group #1 and antenna group #2. Mapping coefficients from multiple antennas of the antenna group #0 to the antenna port #0 constitute an analog beamforming vector #0; mapping coefficients from the antenna group #0 to the antenna port #0 constitute a digital beamforming vector #0; a beamforming vector corresponding to the antenna port #0 is acquired as a product of the analog beamforming vector #0 and the digital beamforming vector #0. Mapping coefficients from multiple antennas of the antenna group #1 and multiple antennas of the antenna group #2 to the antenna port #1 respectively constitute an analog beamforming vector #1 and an analog beamforming vector #2; and mapping coefficients from the antenna group #1 and the antenna group #2 to the antenna port #1 constitute a digital beamforming vector #1. A beamforming vector corresponding to the antenna port #1 is acquired as a product of an analog beamforming matrix formed by the analog beamforming vector #1 and the analog beamforming vector #2 arranged diagonally and the digital beamforming vector #1.

In one embodiment, the specific meaning of the antenna port can be found in 3GPP TS36.211, section 5.2 and 6.2, or in 3GPP TS38.211, section 4.4.

In one embodiment, a small-scale channel parameter that a radio signal transmitted from one antenna port goes through can be used for inferring that of another radio signal transmitted from the antenna port goes through.

In one embodiment, a small-scale channel parameter that a radio signal transmitted from one antenna port goes through cannot be used for inferring that of a radio signal transmitted from another antenna port goes through.

In one embodiment, the small-scale channel parameter includes one or more of Channel Impulse Response (CIR), a Precoding Matrix Indicator (PMI), a Channel Quality Indicator (CQI), and a Rank Indicator (RI).

In one embodiment, an antenna port only comprises one antenna group, i.e., one RF chain, for instance, the antenna port #0 in FIG. 11.

In one subembodiment of the above embodiment, the analog beamforming matrix corresponding to the one antenna port is subjected to dimensionality reduction to form an analog beamforming vector, and the digital beamforming vector corresponding to the one antenna port is subjected to dimensionality reduction to form a scaler, a beamforming vector corresponding to the one antenna port is equal to an analog beamforming vector corresponding thereto. For example, the antenna port #0 in FIG. 11 only comprises the antenna group #0, the digital beamforming vector #0 in FIG. 11 is subjected to dimensionality reduction to form a scaler, a beamforming vector corresponding to the antenna port #0 is the analog beamforming vector #0.

In one embodiment, an antenna port comprises multiple antenna groups, i.e., multiple RF chains, for instance, the antenna port #1 in FIG. 11.

In one embodiment, two antenna ports being Quasi Co-Located means that the two antenna ports are QCL, the specific meaning of the QCL can be found in 3GPP TS38.211, section 4.4 and 3GPP TS38.214, section 5.1.5.

In one embodiment, two antenna ports being QCL refers to that large-scale properties of a channel that a radio signal transmitted from one of the two antenna ports goes through can be used for inferring large-scale properties of a channel that a radio signal transmitted from the other of the two antenna ports goes through.

In one embodiment, the large-scale properties include one or more of delay spread, Doppler spread, Doppler shift, average gain, average delay, and Spatial Rx parameters.

In one embodiment, Spatial Rx parameters include one or more of a received beam, a received analog beamforming matrix, a received analog beamforming vector, a received digital beamforming vector, a received beamforming vector, and a Spatial Domain Receive Filter.

Embodiment 12

Figures 12, 13, 14:
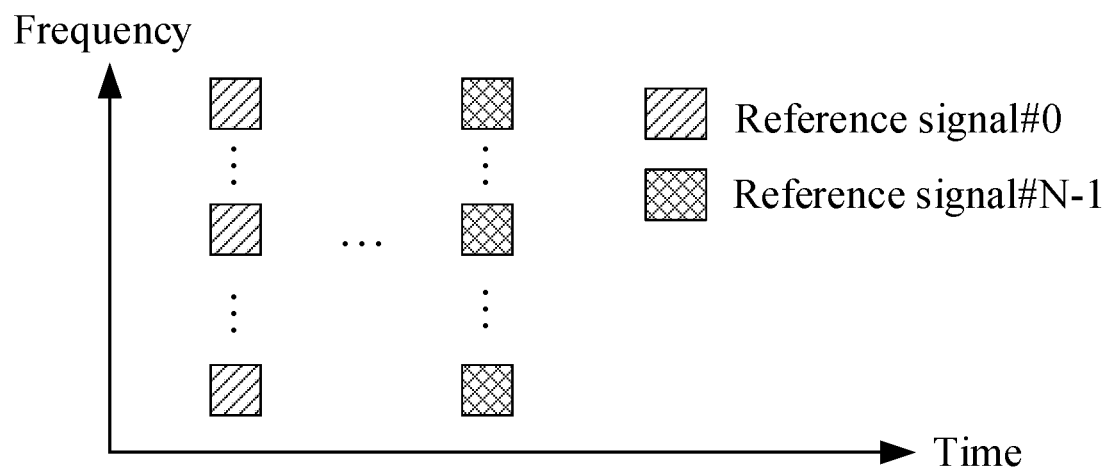
FIG. 12 illustrates a schematic diagram of a UE assumes that a transmission antenna port of a first radio signal and a transmission antenna port of any reference signal in a first reference signal group are QCL according to one embodiment of the present disclosure.
FIG. 13 illustrates a schematic diagram of a UE assumes that a transmission antenna port of a first radio signal and a transmission antenna port of any reference signal in a first reference signal group are QCL according to one embodiment of the present disclosure.
FIG. 14 illustrates a schematic diagram of resource mapping of N reference signal(s) in time-frequency domain according to one embodiment of the present disclosure.

Embodiment 12 illustrates a schematic diagram of a UE assumes that a transmission antenna port of a first radio signal and a transmission antenna port of any reference signal in a first reference signal group are QCL, as shown in FIG. 12.

In Embodiment 12, the first reference signal group consists of a first reference signal and a second reference signal. The UE assumes that a transmission antenna port of the first radio signal is QCL to a transmission antenna port of the first reference signal and a transmission antenna port of the second reference signal, but corresponds to different QCL types.

In one embodiment, the first reference signal group only comprises a first reference signal and a second reference signal, and the UE assumes that a transmission antenna port of the first radio signal is QCL to a transmission antenna port of the first reference signal and a transmission antenna port of the second reference signal; and the UE assumes that a QCL type between a transmission antenna port of the first radio signal and a transmission antenna port of the first reference signal is different from that between a transmission antenna port of the first radio signal and a transmission antenna port of the second reference signal.

In one subembodiment of the above embodiment, the UE assumes that a QCL type between a transmission antenna port of the first radio signal and a transmission antenna port of the first reference signal is QCL-TypeD.

In one subembodiment of the above embodiment, the UE assumes that a QCL type between a transmission antenna port of the first radio signal and a transmission antenna port of the second reference signal is QCL-TypeA.

In one embodiment, a QCL type between one antenna port and another antenna port being QCL-TypeD means that Spatial Rx parameters of a radio signal transmitted from the one antenna port can be used for inferring Spatial Rx parameters of a radio signal transmitted from the another antenna port.

In one embodiment, a QCL type between one antenna port and another antenna port being QCL-TypeA means that delay spread, Doppler spread, Doppler shift, and average delay of a channel that a radio signal transmitted from the one antenna port goes through can be used for inferring delay spread, Doppler spread, Doppler shift, and average delay of a channel that a radio signal transmitted on the another antenna port goes through.

In one embodiment, specific meanings of the QCL type, the QCL-TypeA, and the QCL-TypeD can be found in 3GPP TS38.214, section 5.1.5.

Embodiment 13

Embodiment 13 illustrates a schematic diagram of a UE assumes that a transmission antenna port of a first radio signal and a transmission antenna port of any reference signal in a first reference signal group are QCL, as shown in FIG. 13.

In Embodiment 13, the first reference signal group consists of a first reference signal. The UE assumes that a transmission antenna port of the first radio signal and a transmission antenna port of the first reference signal group are QCL.

In one embodiment, the first reference signal group only comprises a first reference signal, and the UE assumes that a transmission antenna port of the first radio signal and a transmission antenna port of the first reference signal are QCL.

In one subembodiment of the above embodiment, the UE assumes that a QCL type between a transmission antenna port of the first radio signal and a transmission antenna port of the first reference signal is one of QCL-TypeA QCL-TypeB, QCL-TypeC or QCL-TypeD.

In one subembodiment of the above embodiment, the UE assumes that a QCL type between a transmission antenna port of the first radio signal and a transmission antenna port of the first reference signal is one of QCL-TypeA or QCL-TypeD.

In one embodiment, a QCL type between one antenna port and another antenna port being QCL-TypeB means that Doppler spread and Doppler shift of a channel that a radio signal transmitted from the one antenna port goes through can be used for inferring Doppler spread and Doppler shift of a channel that a radio signal transmitted on the another antenna port goes through.

In one embodiment, a QCL type between one antenna port and another antenna port being QCL-TypeC means that Doppler shift and average delay of a channel that a radio signal transmitted from the one antenna port goes through can be used for inferring Doppler shift and average delay of a channel that a radio signal transmitted on the another antenna port goes through.

In one embodiment, specific meanings of the QCL-TypeB, and the QCL-TypeC can be found in 3GPP TS38.214, section 5.1.5.

Embodiment 14

Embodiment 14 illustrates a schematic diagram of resource mapping of N reference signal(s) in time-frequency domain, as shown in FIG. 14.

In Embodiment 14, the UE in the present disclosure receives the N reference signal(s) on an air interface, N1 reference signal(s) in the N reference signal(s) is(are) transmitted by the first serving cell in the present disclosure; a reference signal in a reference signal group indicated by at least one of the M piece(s) of sub-information in the present disclosure is a reference signal in the N1 reference signal(s), N being a positive integer, N1 being a positive integer no greater than the N. In FIG. 14, an index of the N reference signal(s) is (are respectively) #0, . . . , #N-1.

In one embodiment, the N reference signal(s) comprises (comprise) CSI-RS(s).

In one embodiment, the N reference signal(s) comprises (comprise) SS/PBCH block(s).

In one embodiment, any of the N reference signal(s) occurs periodically in time domain.

In one embodiment, any of the N reference signal(s) occurs multiple times in time domain.

In one subembodiment of the above embodiment, time intervals of any two adjacent occurrences of any of the N reference signal(s) in time domain are equal.

In one embodiment, at least one of the N reference signal(s) is wideband.

In one embodiment, at least one of the N reference signal(s) is narrowband.

In one embodiment, the N1 reference signal(s) comprises (comprise) SS/PBCH block(s).

In one embodiment, any of the N1 reference signal(s) is an SS/PBCH block.

In one embodiment, at least one of the N1 reference signal(s) is a CSI-RS.

In one embodiment, any of the N1 reference signal(s) is narrowband.

In one embodiment, at least one of the N1 reference signal(s) is wideband.

In one embodiment, a reference signal being wideband means that a system bandwidth is divided into a positive integer number of frequency-domain region(s), the one reference signal occurs in each of the positive integer number of frequency-domain region(s), and any of the positive integer number of frequency-domain region(s) comprises a positive integer number of consecutive subcarriers.

In one embodiment, a reference signal being narrowband means that a system bandwidth is divided into a positive integer number of frequency-domain region(s), the one reference signal only occurs in part of the positive integer number of frequency-domain region(s), and any of the positive integer number of frequency-domain region(s) comprises a positive integer number of consecutive subcarriers.

In one embodiment, any two of the positive integer number of frequency-domain regions comprise equal numbers of subcarriers.

In one embodiment, the N is equal to the N1.

In one embodiment, the N is greater than the N1.

In one embodiment, the N is greater than the N1, and at least one of the N reference signals not belonging to the N1 reference signal(s) is transmitted by the second serving cell in the present disclosure.

In one embodiment, only the N1 reference signal(s) in the N reference signal(s) is(are) transmitted by the first serving cell.

In one embodiment, N2 reference signal(s) in the N reference signal(s) is(are) transmitted by the second serving cell in the present disclosure, N2 being a positive integer less than the N.

In one embodiment, a sum of the N1 and the N2 is equal to the N.

In one embodiment, a sum of the N1 and the N2 is less than the N.

In one embodiment, the N2 reference signal(s) comprises (comprise) CSI-RS(s).

In one embodiment, the N2 reference signal(s) comprises (comprise) SS/PBCH block(s).

Embodiment 15

Figures 15, 16, 17:
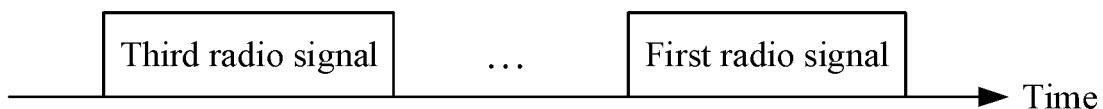
FIG. 15 illustrates a schematic diagram of second information according to one embodiment of the present disclosure.
FIG. 16 illustrates a schematic diagram of third information according to one embodiment of the present disclosure.
FIG. 17 illustrates a schematic diagram of a relation between time resources occupied by a third radio signal and time resources occupied by a first radio signal according to one embodiment of the present disclosure.

Embodiment 15 illustrates a schematic diagram of second information, as shown in FIG. 15.

In Embodiment 15, the UE in the present disclosure receives the second information in the first serving cell; the second information indicates index(es) of the N1 reference signal(s) in the present disclosure and an index of the first serving cell.

In one embodiment, an index of the first serving cell is a CellIdentity.

In one embodiment, an index of the first serving cell is a PhysCellId.

In one embodiment, index(es) of the N1 reference signal(s) is(are) respectively SS/PBCH Block (SSB) index(es).

In one embodiment, the second information is carried by an SS/PBCH block transmitted by the first serving cell.

In one embodiment, an SS/PBCH block transmitted by the first serving cell indicates the second information.

In one embodiment, an SS/PBCH block transmitted by the first serving cell implicitly indicates the second information.

In one embodiment, the second information is carried by the N1 reference signal(s).

In one embodiment, the N1 reference signal(s) indicates (indicate) the second information.

In one embodiment, the N1 reference signal(s) implicitly indicates(indicate) the second information.

In one embodiment, the N1 reference signal(s) is(are) N1 SS/PBCH block(s) transmitted by the first serving cell; SS(s) in the N1 reference signal(s) indicates an index of the first serving cell.

In one subembodiment of the above embodiment, a Primary synchronization sequence and a Secondary synchronization sequence in the N1 reference signal(s) implicitly indicates an index of the first serving cell.

In one embodiment, the N1 reference signal(s) is (are respectively) N1 SS/PBCH block(s) transmitted by the first serving cell; for any given reference signal in the N1 reference signal(s), at least the former of a DMRS and a PBCH payload on a PBCH in the given reference signal is used for determining an index of the given reference signal.

In one subembodiment of the above embodiment, a DMRS sequence on a PBCH in the given reference signal implicitly indicates an index of the given reference signal.

In one subembodiment of the above embodiment, a DMRS sequence and a PBCH payload bit $\bar{a}_{\bar{A}+5}$, $\bar{a}+_{\bar{A}+6}$, $\bar{a}_{\bar{A}+7}$ on a PBCH in the given reference signal indicate an index of the given reference signal together.

In one subembodiment of the above embodiment, a DMRS sequence on a PBCH in the given reference signal implicitly indicates 3 Least Significant Bits(LSB) of an index of the given reference signal, and a payload bit $\bar{a}_{\bar{A}+5}$, $\bar{a}+_{\bar{A}+6}$, $\bar{a}_{\bar{A}+7}$ of a PBCH of the given reference signal indicates 3 Most Significant Bit (MSB) Bits of an index of the given reference signal.

In one embodiment, the specific meaning of the payload bit $\bar{a}_{\bar{A}+5}$, $\bar{a}+_{\bar{A}+6}$, $\bar{a}_{\bar{A}+7}$ of the PBCH can be found in 3GPP TS38.213 and TS38.212.

Embodiment 16

Embodiment 16 illustrates a schematic diagram of third information, as shown in FIG. 16.

In Embodiment 16, the third information is used for activating M1 piece(s) of sub-information out of the M piece(s) of sub-information in the present disclosure, the first sub-information in the present disclosure is one of the M1 piece(s) of sub-information, M1 being a positive integer no greater than the M.

In one embodiment, the third information is carried by a Medium Access Control Layer Control Element (MAC CE) signaling.

In one embodiment, the third information is carried by a TCI States Activation/Deactivation for UE-specific PDSCH MAC CE, and the specific meaning of the TCI States Activation/Deactivation for UE-specific PDSCH MAC CE can be found in 3GPP TS38.321.

In one subembodiment of the above embodiment, the first radio signal in the present disclosure is transmitted on a downlink physical-layer data channel.

In one embodiment, the third information is carried by a TCI State Indication for UE-specific PDCCH MAC CE, and the specific meaning of the TCI State Indication for UE-specific PDCCH MAC CE can be found in 3GPP TS38.321.

In one subembodiment of the above embodiment, the first radio signal in the present disclosure is transmitted on a downlink physical-layer control channel.

In one embodiment, the third information comprises second sub-information, the second sub-information indicates a Serving Cell ID, and the specific meaning of the Serving Cell ID can be found in 3GPP TS38.321.

In one embodiment, the third information comprises third sub-information, the third sub-information indicates a BWP ID, and the specific meaning of the BWP ID can be found in 3GPP TS38.321.

In one embodiment, the third information comprises fourth sub-information, the fourth sub-information indicates Ti, and the Ti activates or deactivates a TCI state whose TCI-StateId is i, and the specific meaning of the Ti can be found in 3GPP TS38.321.

In one embodiment, the third information comprises fifth sub-information, and the fifth sub-information indicates an index of the first time-frequency resource set in the present disclosure.

In one embodiment, an index of the first time-frequency resource set is a ControlResourceSetId.

In one embodiment, the third information comprises sixth sub-information, and the sixth sub-information indicates an index of the first sub-information.

In one embodiment, an index of the first sub-information is TCI-StateId.

Embodiment 17

Embodiment 17 illustrates a schematic diagram of a relation between time resources occupied by a third radio signal and time resources occupied by a first radio signal, as shown in FIG. 17.

In Embodiment 17, the first radio signal is transmitted on a downlink physical-layer control channel. A time interval between a start time of time resources occupied by the first radio signal and an end time of a slot occupied by the third radio signal is no less than a first threshold.

In one subembodiment of the above embodiment, the first threshold is fixed (no need to be configured).

In one subembodiment of the above embodiment, the first threshold is 3 ms.

Embodiment 18

Embodiment 18 illustrates a schematic diagram of a relation between time resources occupied by a third radio signal and time resources occupied by a first signaling, as shown in FIG. 18.

In Embodiment 18, the first radio signal in the present disclosure is transmitted on a downlink physical layer data channel. The first signaling comprises scheduling information of the first radio signal. The third radio signal is transmitted on a slot n; a slot occupied by the first signaling is no earlier than slot $n+3N_{slot}^{subframe, \mu}+1$, the $N_{slot}^{subframe, \mu}$ is a number of slots comprised in a sub-frame corresponding to carrier spacing $\mu$, and the specific meaning of the $N_{slot}^{subframe, \mu}$ can be found in 3GPP TS38.214, section 5.1.5.

Embodiment 19

Embodiment 19 illustrates a schematic diagram of generating a first radio signal, as shown in FIG. 19.

In Embodiment 19, the first radio signal is transmitted on a downlink physical-layer control channel, and a first parameter is used for generating the first radio signal.

In one embodiment, the first parameter is used for generating at least one of a scrambling sequence or a DMRS corresponding to the first radio signal.

In one embodiment, the first parameter is configured by a serving cell added by the UE in the present disclosure through a pdcch-DMRS-ScramblingID.

In one embodiment, the first parameter is a non-negative integer no greater than 65535.

In one embodiment, the specific meaning of the pdcch-DMRS-ScramblingID can be found in 3GPP TS38.331.

In one embodiment, the first parameter is a PhysCellId of the second serving cell in the present disclosure.

In one embodiment, a PhysCellId of the second serving cell in the present disclosure is used for generating the first radio signal.

In one embodiment, the second base station in the present disclosure transmits the first radio signal in the first time-frequency resource set in the present disclosure, and a PhysCellId of the second serving cell in the present disclosure is used for generating the first radio signal.

Embodiment 20

Embodiment 20 illustrates a schematic diagram of generating a first radio signal, as shown in FIG. 20.

In Embodiment 20, the first radio signal is transmitted on a downlink physical layer data channel, and a second parameter and a third parameter are used for generating the first radio signal.

In one embodiment, the second parameter is used for generating a scrambling sequence corresponding to the first radio signal, and a third parameter is used for generating a DMRS corresponding to the first radio signal.

In one embodiment, the second parameter is configured by a serving cell added by the UE in the present disclosure through a dataScramblingIdentityPDSCH.

In one embodiment, the second parameter is a non-negative integer no greater than 1023.

In one embodiment, the third parameter is configured by a serving cell added by the UE in the present disclosure through a scramblingID0 or a scramblingID1.

In one embodiment, the third parameter is a non-negative integer no greater than 65535.

In one embodiment, the second parameter is a PhysCellId of the second serving cell in the present disclosure.

In one embodiment, the third parameter is a PhysCellId of the second serving cell in the present disclosure.

Embodiment 21

Embodiment 21 illustrates a schematic diagram of generating a first signaling, as shown in FIG. 21, in Embodiment 21, a fourth parameter is used for generating the first signaling, and the first signaling comprises scheduling information of the first radio signal in the present disclosure.

In one embodiment, the fourth parameter is used for generating at least one of a scrambling sequence and a DMRS corresponding to the first signaling.

In one embodiment, the fourth parameter is configured by a serving cell added by the UE in the present disclosure through a pdcch-DMRS-ScramblingID.

In one embodiment, the fourth parameter is a non-negative integer no greater than 65535.

In one embodiment, the fourth parameter is a PhysCellId of the second serving cell in the present disclosure.

In one embodiment, a PhysCellId of the second serving cell in the present disclosure is used for generating the first signaling.

In one embodiment, the second base station in the present disclosure transmits the first signaling, and a PhysCellId of the second serving cell in the present disclosure is used for generating the first signaling.

Embodiment 22

Embodiment 22 illustrates a schematic diagram of fourth information content, as shown in FIG. 22.

In Embodiment 22, the fourth information indicates the first time-frequency resource set in the present disclosure.

In one embodiment, the fourth information indicates an index of the first time-frequency resource set.

In one embodiment, the fourth information comprises a PhysCellId of the second serving cell in the present disclosure.

In one embodiment, the fourth information comprises a first index, the first index is used by the second base station in the present disclosure for generating the first radio signal in the present disclosure.

In one embodiment, the first index is used by the second base station for generating a scrambling sequence corresponding to the first radio signal.

In one embodiment, the first index is used by the second base station for generating a DMRS corresponding to the first radio signal.

In one embodiment, the first index indicates $n_{ID}$, the $n_{ID}$ is used by the second base station for determining an initial value of a scrambling sequence generator corresponding to the first radio signal, and the specific function of the $n_{ID}$ can be found in 3GPP TS38.211, section 7.3.

In one embodiment, the first index indicates $N_{ID}$, the $N_{ID}$ is used by the second base station for determining an initial value of an RS sequence generator corresponding to the first radio signal, and the specific function of the $N_{ID}$ can be found in 3GPP TS38.211, section 7.4.

In one embodiment, the first index is a non-negative integer no greater than 65535.

In one embodiment, the first index is a non-negative integer no greater than 1023.

In one embodiment, the first index is a PhysCellId of the second serving cell.

In one embodiment, the fourth information comprises a third index, and the third index is used by the second base station for generating a DMRS corresponding to the first radio signal.

In one embodiment, the third index indicates $N_{ID}^0$ or $N_{ID}^1$, the $N_{ID}^0$ or the $N_{ID}^1$ is used by the second base station for determining an initial value of an RS sequence generator of a DMRS corresponding to the first radio signal, and the specific function of the $N_{ID}^0$ or the $N_{ID}^1$ can be found in 3GPP TS38.211, section 7.4.

In one embodiment, the third index is a non-negative integer no greater than 65535.

In one embodiment, the third index is a PhysCellId of the second serving cell.

In one embodiment, the fourth information comprises a fourth index, and the fourth index is used by the second base station for generating the first signaling in the present disclosure.

In one embodiment, the fourth index is used by the second base station for generating a scrambling sequence corresponding to the first signaling.

In one embodiment, the fourth index is used by the second base station for generating a DMRS corresponding to the first signaling.

In one embodiment, the fourth index indicates $n_{ID}$, the $n_{ID}$ is used by the second base station for determining an initial value of a scrambling sequence generator corresponding to the first signaling, and the specific function of the $n_{ID}$ can be found in 3GPP TS38.211, section 7.3.

In one embodiment, the fourth index indicates $N_{ID}$, the $N_{ID}$ is used by the second base station for determining an initial value of an RS sequence generator corresponding to the first signaling, and the specific function of the $N_{ID}$ can be found in 3GPP TS38.211, section 7.4.

In one embodiment, the fourth index is a non-negative integer no greater than 65535.

In one embodiment, the fourth index is a PhysCellId of the second serving cell.

In one embodiment, the fourth information comprises a fifth index, and the fifth index indicates a $n_{RNTI}$.

In one subembodiment of the above embodiment, the $n_{RNTI}$ is used by the second base station for determining an initial value of a scrambling sequence generator corresponding to the first radio signal, and the specific function of the $n_{RNTI}$ can be found in 3GPP TS38.211, section 7.3.

In one subembodiment of the above embodiment, the $n_{RNTI}$ is used by the second base station for determining an initial value of a scrambling sequence generator corresponding to the first signaling, and the specific function of the $n_{RNTI}$ can be found in 3GPP TS38.211, section 7.3.

In one embodiment, the fourth information indicates time-frequency resources occupied by the first signaling.

Embodiment 23

Embodiment 23 illustrates a schematic diagram of a fourth radio signal, as shown in FIG. 23.

In Embodiment 23, the fourth radio signal indicates a target reference signal out of K reference signal(s), at least one of the K reference signal(s) is transmitted by the first serving cell in the present disclosure; the target reference signal is used for determining whether the first radio signal in the present disclosure is transmitted by the first serving cell. A radio resource occupied by the fourth radio signal is one of the K radio resource(s), and the K radio resource(s) corresponds (respectively correspond) to the K reference signal(s). A radio resource occupied by the fourth radio signal is used for indicating the target reference signal out of the K reference signal(s).

In one embodiment, when the target reference signal is transmitted by the first serving cell, the first radio signal is transmitted by the first serving cell; when the target reference signal is not transmitted by the first serving cell, the first radio signal is not transmitted by the first serving cell.

In one embodiment, the fourth radio signal comprises a Random Access Channel (RACH) Preamble.

In one embodiment, the fourth radio signal is transmitted on a Physical Random Access CHannel (PRACH).

In one embodiment, a radio resource occupied by the fourth radio signal is related to the target reference signal.

In one embodiment, the radio resource comprises one or more of a time resource, a frequency resource and a code-domain resource.

In one embodiment, the code-domain resource comprises a RACH Preamble.

In one embodiment, the code-domain resource comprises a RACH Preamble sequence.

In one embodiment, the K reference signal(s) comprises (comprise) CSI-RS(s).

In one embodiment, the K reference signal(s) comprises (comprise) SS/PBCH block(s).

In one embodiment, the K reference signal(s) is(are) configured by BeamFailureRecoveryConfig IE(s).

In one embodiment, the K reference signal(s) is(are) configured by candidateBeamRSList field(s) in BeamFailureRecoveryConfig IE(s).

In one embodiment, a radio resource occupied by the fourth radio signal is used for indicating the target reference signal out of the K reference signal(s).

In one embodiment, a radio resource occupied by the fourth radio signal is one of the K radio resource(s), and the K radio resource(s) corresponds (respectively correspond) to the K reference signal(s).

In one embodiment, the K radio resource(s) is(are) configured by BeamFailureRecoveryConfig IE(s).

In one embodiment, the K radio resource(s) is(are) configured by candidateBeamRSList field(s) in BeamFailureRecoveryConfig IE(s).

In one embodiment, the K is a positive integer no greater than maxNrofCandidateBeams.

In one embodiment, the specific meaning of the BeamFailureRecoveryConfig IE can be found in 3GPP TS38.331.

In one embodiment, the specific meaning of the candidateBeamRSList can be found in 3GPP TS38.331.

In one embodiment, the specific meaning of the maxNrofCandidateBeams can be found in 3GPP TS38.331.

In one embodiment, a PhysCellId of the second serving cell in the present disclosure is used for generating the fourth radio signal.

In one embodiment, a fifth parameter is used for generating the fourth radio signal, and the fifth parameter is configured by a serving cell added by the UE through zeroCorrelationZoneConfig.

In one embodiment, a fifth parameter and a sixth parameter are used for generating the fourth radio signal, the fifth parameter is configured by a serving cell added by the UE through zeroCorrelationZoneConfig, and the sixth parameter is configured by a serving cell added by the UE through restrictedSetConfig.

In one embodiment, the specific meaning of the zeroCorrelationZoneConfig can be found in 3GPP TS38.331.

In one embodiment, the specific meaning of the restrictedSetConfig can be found in 3GPP TS38.331.

In one embodiment, the fifth parameter is a non-negative integer no greater than 15.

In one embodiment, the sixth parameter is one of unrestrictedSet, restrictedSetTypeA or restrictedSetTypeB.

Embodiment 24

Figure 24:
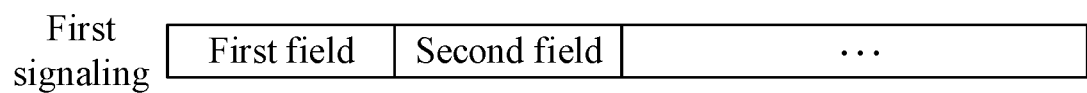
FIG. 24 illustrates a schematic diagram of first signaling content according to one embodiment of the present disclosure.

Embodiment 24 illustrates a schematic diagram of first signaling content, as shown in FIG. 24.

In Embodiment 24, the first signaling comprises scheduling information of the first radio signal in the present disclosure. The first signaling comprises a first field and a second field, the first field in the first signaling indicates the first sub-information in the present disclosure, and the second field in the first signaling indicates the first time-frequency resource set in the present disclosure.

In one embodiment, the first signaling is a physical-layer signaling.

In one embodiment, the first signaling is a dynamic signaling.

In one embodiment, the first signaling is a dynamic signaling for Downlink Grant.

In one embodiment, the first signaling is Downlink Control Information (DCI).

In one embodiment, the first signaling is a DownLink Grant DCI.

In one embodiment, the first signaling is DCI identified by a C-RNTI.

In one embodiment, a CRC of the first signaling is scrambled by C-RNTI.

In one embodiment, the first signaling indicates the first time-frequency resource set.

In one embodiment, the first signaling indicates the first sub-information out of the M piece(s) of sub-information.

In one embodiment, the first signaling indicates the first sub-information out of the M1 piece(s) of sub-information.

In one embodiment, the first signaling indicates an index of the first sub-information out of the M1 piece(s) of sub-information.

In one embodiment, the first field in the first signaling comprises a TCI field.

In one embodiment, the first field in the first signaling comprises part or all of information in a TCI field.

In one embodiment, the first field in the first signaling consists of 3 bits.

In one embodiment, the specific meaning of the TCI field can be found in 3GPP TS38.212, section 7.3.

In one embodiment, the second field in the first signaling comprises a Frequency domain resource assignment field and a Time domain resource assignment field.

In one embodiment, the second field in the first signaling comprises part or all of information in a Frequency domain resource assignment field and a Time domain resource assignment field.

In one embodiment, the specific meanings of the Frequency domain resource assignment field and the Time domain resource assignment field can be found in 3GPP TS38.212, section 7.3.

Embodiment 25

Figure 25:
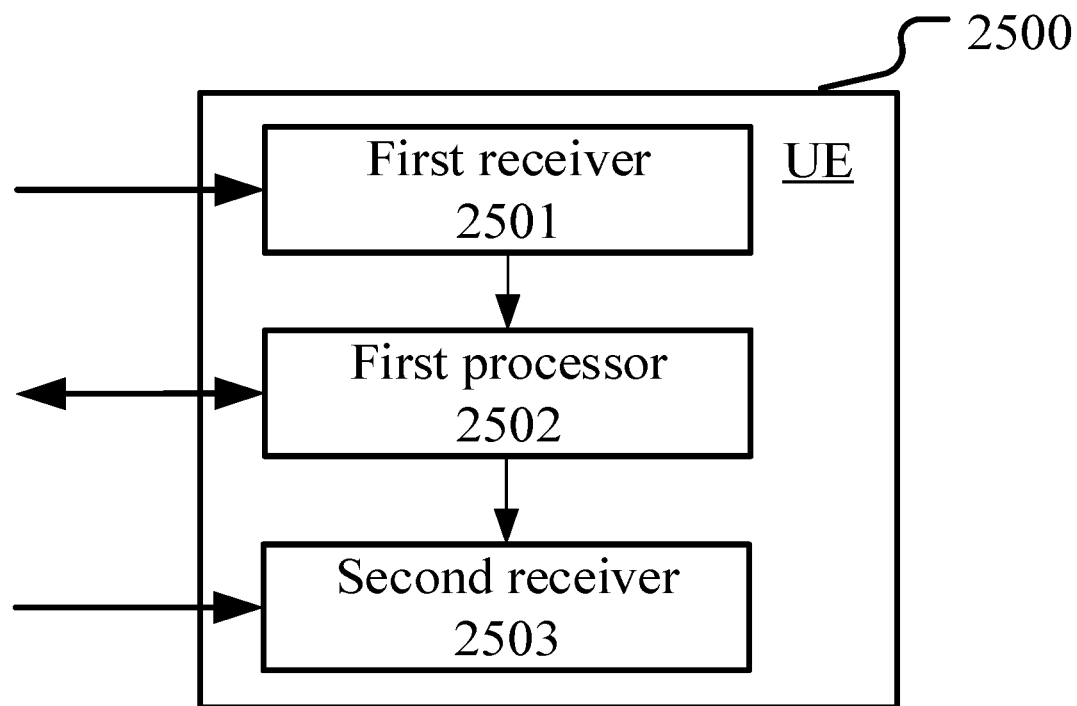
FIG. 25 illustrates a structure block diagram of a processing device in a UE according to one embodiment of the present disclosure.

Embodiment 25 illustrates a structure block diagram of a processing device in a UE, as shown in FIG. 25. In FIG. 25, the UE's processing device 2500 mainly consists of a first receiver 2501, a first processor 2502 and a second receiver 2503.

In Embodiment 25, the first receiver 2501 receives first information; the first processor 2502 determines first sub-information out of M piece(s) of sub-information; and the second receiver 2503 receives a first radio signal in a first time-frequency resource set.

In Embodiment 25, the first information comprises the M piece(s) of sub-information, each of the M piece(s) of sub-information indicates a reference signal group, and a reference signal group comprises at least one reference signal; the first sub-information indicates a first reference signal group; a reference signal in a reference signal group indicated by at least one of the M piece(s) of sub-information is transmitted by a first serving cell, and the first serving cell is not added by the UE; the UE assumes that a transmission antenna port of the first radio signal and a transmission antenna port of any reference signal in the first reference signal group are QCL, M being a positive integer.

In one embodiment, the first receiver 2501 receives N reference signal(s); herein, N1 reference signal(s) in the N reference signal(s) is(are) transmitted by the first serving cell; a reference signal in a reference signal group indicated by at least one of the M piece(s) of sub-information is a reference signal in the N1 reference signal(s), N being a positive integer, N1 being a positive integer no greater than the N.

In one embodiment, the first receiver 2501 receives second information on the first serving cell; herein, the second information indicates index(es) of the N1 reference signal(s) and an index of the first serving cell.

In one embodiment, the first receiver 2501 receives a second radio signal; herein, the second radio signal carries third information, the third information being used for activating M1 piece(s) of sub-information out of the M piece(s) of sub-information, and the first sub-information is one of the M1 piece(s) of sub-information, M1 being a positive integer no greater than the M.

In one embodiment, the first processor 2502 transmits a third radio signal; herein, the third radio signal is used for determining that the second radio signal is correctly received.

In one embodiment, the first radio signal is transmitted on a physical-layer control channel; and the first information indicates the first time-frequency resource set.

In one embodiment, the second receiver 2503 receives a first signaling; herein, the first radio signal is transmitted on a physical-layer data channel, and the first signaling comprises scheduling information of the first radio signal; and the first signaling indicates the first sub-information.

In one embodiment, the first processor 2502 transmits a fourth radio signal; herein, the fourth radio signal indicates a target reference signal out of K reference signal(s), at least one of the K reference signal(s) is transmitted by the first serving cell; and the target reference signal is used for determining whether the first radio signal is transmitted by the first serving cell.

In one embodiment, the first receiver 2501 comprises at least one of the antenna 452, the receiver 454, the receiving processor 456, the multi-antenna receiving processor 458, the controller/processor 459, the memory 460, or the data source 467 in Embodiment 4.

In one embodiment, the first processor 2502 comprises at least one of the antenna 452, the transmitter/receiver 454, the transmitting processor 468, the receiving processor 456, the multi-antenna transmitting processor 457, the multi-antenna receiving processor 458, the controller/processor 459, the memory 460 or the data source 467 in Embodiment 4.

In one embodiment, the second receiver 2503 comprises at least one of the antenna 452, the receiver 454, the receiving processor 456, the multi-antenna receiving processor 458, the controller/processor 459, the memory 460, or the data source 467 in Embodiment 4.

Embodiment 26

Figure 26:
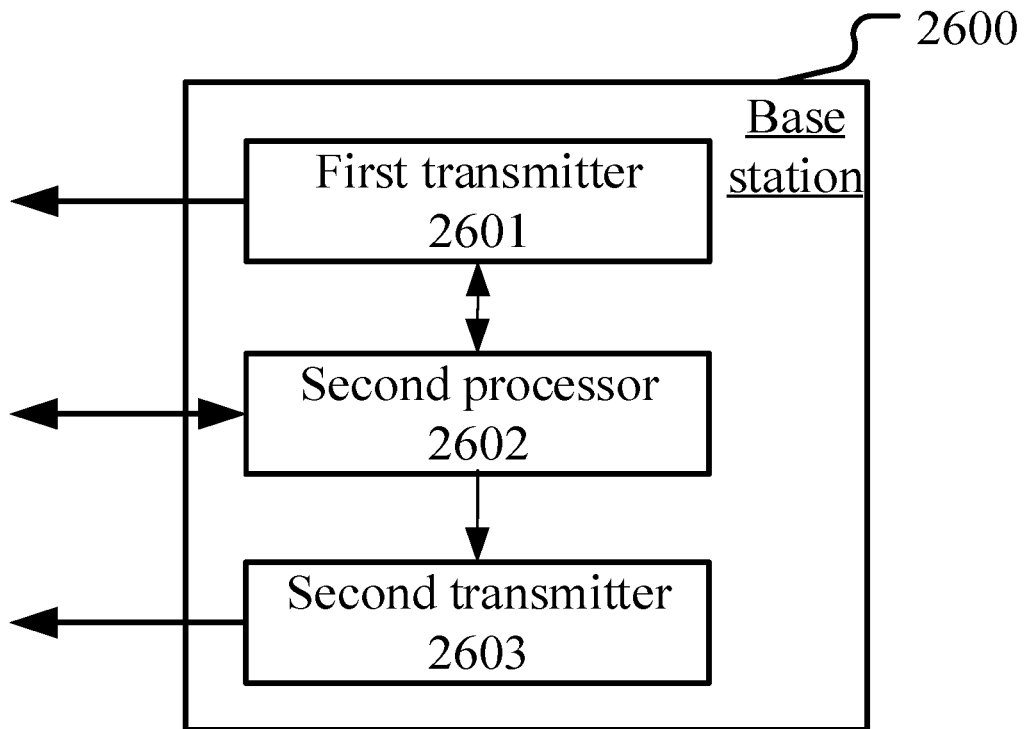
FIG. 26 illustrates a structure block diagram of a processing device in a first base station according to one embodiment of the present disclosure.

Embodiment 26 illustrates a structure block diagram of a processing device in a first base station, as shown in FIG. 26. In FIG. 26, the first base station's processing device 2600 mainly consists of a first transmitter 2601, a second processor 2602 and a second transmitter 2603.

In Embodiment 26, the first transmitter 2601 transmits first information, the first information comprises M piece(s) of sub-information, each of the M piece(s) of sub-information indicates a reference signal group, a reference signal group comprises at least one reference signal; the second processor 2602 determines first sub-information out of the M piece(s) of sub-information, and the first sub-information indicates a first reference signal group; the second transmitter 2603 transmits a first radio signal in a first time-frequency resource set, wherein a reference signal in the first reference signal group is transmitted by a serving cell maintained by the first base station; or, drops transmission of the first radio signal in the first time-frequency resource set, wherein a reference signal in the first reference signal group is not transmitted by a serving cell maintained by the first base station.

In Embodiment 26, a reference signal in a reference signal group indicated by at least one of the M piece(s) of sub-information is transmitted by a first serving cell, and the first serving cell is not added by a target receiver of the first radio signal; at least one serving cell maintained by the first base station is added by a target receiver of the first radio signal; a target receiver of the first radio signal assumes that a transmission antenna port of the first radio signal and a transmission antenna port of any reference signal in the first reference signal group are QCL, M being a positive integer.

In one embodiment, the first transmitter 2601 transmits N2 reference signal(s) on a second serving cell; herein, the first base station is a maintenance base station of the second serving cell, and the second serving cell is added by the target receiver of the first radio signal; a reference signal in a reference signal group indicated by at least one of the M piece(s) of sub-information is a reference signal in the N2 reference signal(s), N2 being a positive integer.

In one embodiment, the first transmitter 2601 transmits a second radio signal; herein, the second radio signal carries third information, the third information being used for activating M1 piece(s) of sub-information out of the M piece(s) of sub-information, and the first sub-information is one of the M1 piece(s) of sub-information, M1 being a positive integer no greater than the M.

In one embodiment, the second processor 2602 receives a third radio signal; herein, the third radio signal is used for determining that the second radio signal is correctly received.

In one embodiment, the first radio signal is transmitted on a physical-layer control channel; and the first information indicates the first time-frequency resource set.

In one embodiment, the second transmitter 2603 transmits a first signaling; herein, the first radio signal is transmitted on a physical-layer data channel, and the first signaling comprises scheduling information of the first radio signal; and the first signaling indicates the first sub-information.

In one embodiment, the second processor 2602 transmits fourth information via a backhaul; herein, the fourth information indicates the first time-frequency resource set.

In one embodiment, the second processor 2602 transmits sixth information via a backhaul; herein, the sixth information indicates index(es) of N1 reference signal(s), the N1 reference signal(s) is(are) transmitted by the first serving cell, and a reference signal in a reference signal group indicated by at least one of the M piece(s) of sub-information is a reference signal in the N1 reference signal(s), N1 being a positive integer.

In one embodiment, the first transmitter 2601 comprises at least one of the antenna 420, the transmitter 418, the transmitting processor 416, the multi-antenna transmitting processor 471, the controller/processor 475, or the memory 476 in Embodiment 4.

In one embodiment, the second processor 2602 comprises at least one of the antenna 420, the transmitter/receiver 418, the transmitting processor 416, the receiving processor 470, the multi-antenna transmitting processor 471, the multi-antenna receiving processor 472, the controller/processor 475 or memory 476 in Embodiment 4.

In one embodiment, the second transmitter 2603 comprises at least one of the antenna 420, the transmitter 418, the transmitting processor 416, the multi-antenna transmitting processor 471, the controller/processor 475, or the memory 476 in Embodiment 4.

Embodiment 27

Figure 27:
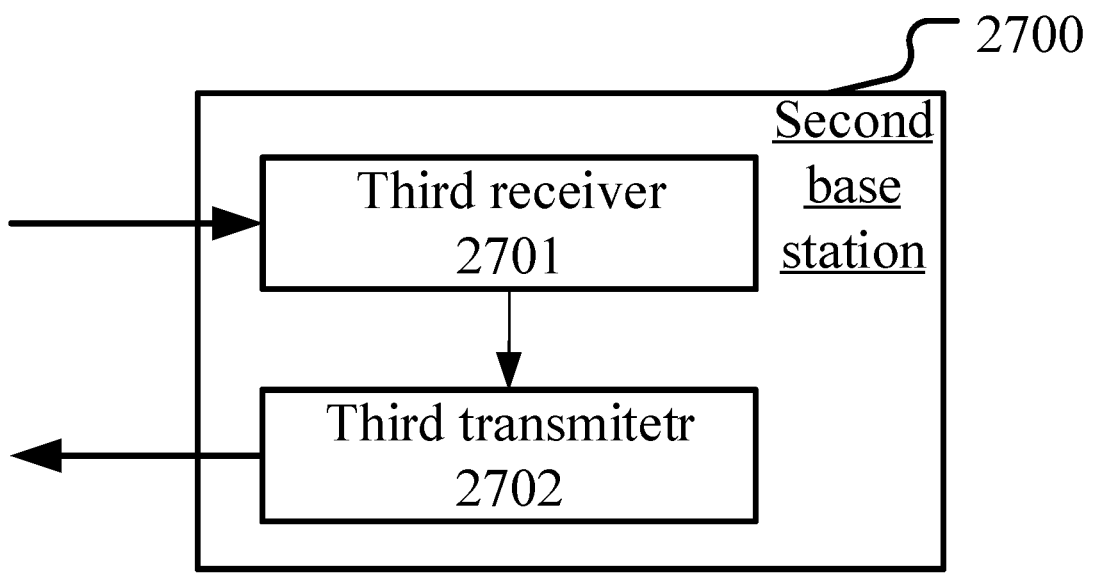
FIG. 27 illustrates a structure block diagram of a processing device in a second base station according to one embodiment of the present disclosure.

Embodiment 27 illustrates a structure block diagram of a processing device in a second base station, as shown in FIG. 27. In FIG. 27, the second base station's processing device 2700 mainly consists of a third receiver 2701 and a third transmitter 2702.

In Embodiment 27, a third receiver 2701 receives fifth information; a third transmitter 2702 transmits a first radio signal in a first time-frequency resource set; or drops transmission of the first radio signal in the first time-frequency resource set.

In Embodiment 27, the fifth information indicates whether the second base station transmits the first radio signal in the first time-frequency resource set, and any serving cell maintained by the second base station is not added by a target receiver of the first radio signal.

In one embodiment, the third transmitter 2702 transmits N1 reference signal(s) on a first serving cell; herein, the second base station is a maintenance base station of the first serving cell; when the second base station transmits the first radio signal in the first time-frequency resource set, the target receiver of the first radio signal assumes that a transmission antenna port of the first radio signal and a transmission antenna port of one of the N1 reference signal(s) are QCL, N1 being a positive integer.

In one embodiment, the third transmitter 2702 transmits second information on the first serving cell; herein, the second information indicates index(es) of the N1 reference signal(s) and an index of the first serving cell.

In one embodiment, the third receiver 2701 receives fourth information via a backhaul; herein, the fourth information indicates the first time-frequency resource set.

In one embodiment, the third transmitter 2702 transmits sixth information via a backhaul; herein, the sixth information indicates index(es) of N1 reference signal(s), the N1 reference signal(s) is(are) transmitted by a first serving cell, and the second base station is a maintenance base station of the first serving cell; when the second base station transmits the first radio signal in the first time-frequency resource set, the target receiver of the first radio signal assumes that a transmission antenna port of the first radio signal and a transmission antenna port of one of the N1 reference signal(s) are QCL, N1 being a positive integer.

In one embodiment, the third receiver 2701 receives a fourth radio signal via an air interface; herein, the fourth radio signal indicates a target reference signal out of K reference signal(s), at least one of the K reference signal(s) is transmitted by a first serving cell, the second base station is a maintenance base station of the first serving cell, and the target reference signal is used for determining the fifth information.

In one embodiment, the fifth information is received via a backhaul.

In one embodiment, the fifth information indicates that the second base station transmits the first radio signal in the first time-frequency resource set; the fifth information indicates a first reference signal group, and the first reference signal group comprises at least one reference signal; a target receiver of the first radio signal assumes that a transmission antenna port of the first radio signal and a transmission antenna port of any reference signal in the first reference signal group are QCL.

In one embodiment, the third transmitter 2702 transmits a first signaling; herein, the first radio signal is transmitted on a physical-layer data channel, and the first signaling comprises scheduling information of the first radio signal; and the first signaling indicates the first reference signal group.

In one embodiment, the third receiver 2701 comprises at least one of the antenna 420, the receiver 418, the receiving processor 470, the multi-antenna receiving processor 472, the controller/processor 475, the memory 476 in Embodiment 4.

In one embodiment, the third transmitter 2702 comprises at least one of the antenna 420, the transmitter 418, the transmitting processor 416, the multi-antenna transmitting processor 471, the controller/processor 475, or the memory 476 in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communications, comprising:
   receiving first information, the first information comprising M piece(s) of sub-information, each of the M piece(s) of sub-information indicating a reference signal group, the reference signal group comprising at least one reference signal;
   determining first sub-information out of the M piece(s) of sub-information, the first sub-information indicating a first reference signal group; and
   receiving a first radio signal in a first time-frequency resource set;
   wherein the M piece(s) of sub-information is(are) respectively carried by M Transmission Configuration Indication (TCI)-State Information Element(IE) (s); a reference signal in the reference signal group indicated by each of at least one of the M piece(s) of sub-information is transmitted by a first serving cell, and the first serving cell is not added by the UE; the UE assumes that a transmission antenna port of the first radio signal and a transmission antenna port of any reference signal in the first reference signal group are Quasi Co-Located (QCL), M being a positive integer; the first serving cell is not a Primary serving Cell (PCell) of the UE; the first serving cell being not added by the UE comprises that the UE is not assigned an SCellIndex for the first serving cell and the UE is not assigned an ServCellIndex for the first serving cell; wherein, an index of a second serving cell is an SCellIndex or an ServCellIndex.

2. The method according to claim 1, comprising at least the former of the following two:
   receiving N reference signal(s); and
   receiving second information on the first serving cell;
   wherein N1 reference signal(s) in the N reference signal(s) is(are) transmitted by the first serving cell; the reference signal in the reference signal group indicated by each of at least one of the M piece(s) of sub-information is a reference signal in the N1 reference signal(s); the second information indicates index(es) of the N1 reference signal(s) and an index of the first serving cell; N is a positive integer, and N1 is a positive integer no greater than the N.

3. The method according to claim 1, comprising at least the former of the following two:
   receiving a second radio signal; and
   transmitting a third radio signal;
   wherein the second radio signal carries third information, the third information being used for activating M1 piece(s) of sub-information out of the M piece(s) of sub-information, and the first sub-information is one of the M1 piece(s) of sub-information, M1 being a positive integer no greater than the M, and the third radio signal is used for determining that the second radio signal is correctly received.

4. The method according to claim 1, wherein the first radio signal is transmitted on a physical-layer control channel, and the first information indicates the first time-frequency resource set;
   or, comprising:
   receiving a first signaling, wherein the first radio signal is transmitted on a physical-layer data channel, the first signaling comprises scheduling information of the first radio signal, and the first signaling indicates the first sub-information.

5. The method according to claim 1, comprising:
   transmitting a fourth radio signal;
   wherein the fourth radio signal indicates a target reference signal out of K reference signal(s), at least one of the K reference signal(s) is transmitted by the first serving cell; the target reference signal is used for determining whether the first radio signal is transmitted by the first serving cell.

6. The method according to claim 1, wherein for a given sub-information of the M pieces of sub-information, the reference signal in the reference signal group indicated by the given sub-information is transmitted by the second serving cell, the second serving cell is added by the UE, and the given sub-information indicates the index of the second serving cell; the second serving cell being added by the UE comprises that the UE is assigned an SCellIndex or an ServCellIndex for the second serving cell.

7. A UE for wireless communications, comprising:
   a first receiver, receiving first information, the first information comprising M piece(s) of sub-information, each of the M piece(s) of sub-information indicating a reference signal group, the reference signal group comprising at least one reference signal;
   a first processor, determining first sub-information out of the M piece(s) of sub-information, the first sub-information indicating a first reference signal group; and
   a second receiver, receiving a first radio signal in a first time-frequency resource set;
   wherein the M piece(s) of sub-information is(are) respectively carried by M Transmission Configuration Indication (TCI)-State Information Element(IE)(s); a reference signal in the reference signal group indicated by each of at least one of the M piece(s) of sub-information is transmitted by a first serving cell, and the first serving cell is not added by the UE; the UE assumes that a transmission antenna port of the first radio signal and a transmission antenna port of any reference signal in the first reference signal group are Quasi Co-Located (QCL), M being a positive integer; the first serving cell is not a Primary serving Cell (PCell) of the UE; the first serving cell being not added by the UE comprises that the UE is not assigned an SCellIndex for the first serving cell and the UE is not assigned an ServCellIndex for the first serving cell; wherein, an index of a second serving cell is an SCellIndex or an ServCellIndex.

8. The UE according to claim 7, wherein the first receiver performs at least the former of the following:
   receiving N reference signal(s); and
   receiving second information on the first serving cell;
   wherein N1 reference signal(s) in the N reference signal(s) is(are) transmitted by the first serving cell; the reference signal in the reference signal group indicated by each of at least one of the M piece(s) of sub-information is a reference signal in the N1 reference signal(s); the second information indicates index(es) of the N1 reference signal(s) and an index of the first serving cell; N is a positive integer, and N1 is a positive integer no greater than the N.

9. The UE according to claim 7, wherein the first receiver receives a second radio signal, or, the first receiver receives a second radio signal and the first processor transmits a third radio signal; wherein the second radio signal carries third information, the third information is used for activating M1 piece(s) of sub-information out of the M piece(s) of sub-information, and the first sub-information is one of the M1 piece(s) of sub-information, M1 being a positive integer no greater than the M, and the third radio signal is used for determining that the second radio signal is correctly received.

10. The UE according to claim 7, wherein the first radio signal is transmitted on a physical-layer control channel, and the first information indicates the first time-frequency resource set;
or, the first receiver receives a first signaling, wherein the first radio signal is transmitted on a physical-layer data channel, the first signaling comprises scheduling information of the first radio signal, and the first signaling indicates the first sub-information.

11. The UE according to claim 7, wherein the first processor transmits a fourth radio signal; wherein the fourth radio signal indicates a target reference signal out of K reference signal(s), at least one of the K reference signal(s) is transmitted by the first serving cell; and the target reference signal is used for determining whether the first radio signal is transmitted by the first serving cell.

12. The UE according to claim 7, wherein for a given sub-information of the M pieces of sub-information, the reference signal in the reference signal group indicated by the given sub-information is transmitted by the second serving cell, the second serving cell is added by the UE, and the given sub-information indicates the index of the second serving cell; the second serving cell being added by the UE comprises that the UE is assigned an SCellIndex or an ServCellIndex for the second serving cell.

13. A first base station for wireless communications, comprising:
a first transmitter, transmitting first information, the first information comprising M piece(s) of sub-information, each of the M piece(s) of sub-information indicating a reference signal group, the reference signal group comprising at least one reference signal;
a second processor, determining first sub-information out of the M piece(s) of sub-information, the first sub-information indicating a first reference signal group; and
a second transmitter, transmitting a first radio signal in a first time-frequency resource set, wherein a reference signal in the first reference signal group is transmitted by a serving cell maintained by the first base station; or, dropping transmission of the first radio signal in the first time-frequency resource set, wherein the reference signal in the first reference signal group is not transmitted by a serving cell maintained by the first base station;
wherein the M piece(s) of sub-information is(are) respectively carried by M Transmission Configuration Indication (TCI)-State Information Element(IE)(s); a reference signal in the reference signal group indicated by each of at least one of the M piece(s) of sub-information is transmitted by a first serving cell, and the first serving cell is not added by a target receiver of the first radio signal; at least one serving cell maintained by the first base station is added by the target receiver of the first radio signal; the target receiver of the first radio signal assumes that a transmission antenna port of the first radio signal and a transmission antenna port of any reference signal in the first reference signal group are Quasi Co-Located (QCL), M being a positive integer; the first serving cell is not a Primary serving Cell (PCell) of the target receiver of the first radio signal; the first serving cell being not added by the target receiver of the first radio signal comprises that the target receiver of the first radio signal is not assigned an SCellIndex for the first serving cell and the UE is not assigned an ServCellIndex for the first serving cell; at least one serving cell maintained by the first base station being added by the target receiver of the first radio signal comprises that the target receiver of the first radio signal is assigned an SCellIndex or an ServCellIndex for each of the at least one serving cell maintained by the first base station; wherein, an index of a second serving cell is an SCellIndex or an ServCellIndex.

14. The first base station according to claim 13, wherein the first transmitter transmits N2 reference signal(s) on the second serving cell; wherein the first base station is a maintenance base station of the second serving cell, and the second serving cell is added by the target receiver of the first radio signal; the reference signal in the reference signal group indicated by each of at least another one of the M piece(s) of sub-information is a reference signal in the N2 reference signal(s), N2 being a positive integer.

15. The first base station according to claim 13, wherein the first transmitter transmits a second radio signal, or the first transmitter transmits a second radio signal and the second processor receives a third radio signal; wherein the second radio signal carries third information, the third information is used for activating M1 piece(s) of sub-information out of the M piece(s) of sub-information, and the first sub-information is one of the M1 piece(s) of sub-information; M1 is a positive integer no greater than the M, and the third radio signal is used for determining that the second radio signal is correctly received.

16. The first base station according to claim 13, wherein the first radio signal is transmitted on a physical-layer control channel, and the first information indicates the first time-frequency resource set;
or, the first transmitter transmits a first signaling, wherein the first radio signal is transmitted on a physical-layer data channel, the first signaling comprises scheduling information of the first radio signal, and the first signaling indicates the first sub-information.

17. The first base station according to claim 13, wherein the second processor performs at least one of the following:
transmitting fourth information via a backhaul; and
receiving sixth information via the backhaul;
wherein the fourth information indicates the first time-frequency resource set; the sixth information indicates index(es) of N1 reference signal(s), the N1 reference signal(s) is(are) transmitted by the first serving cell, and the reference signal in the reference signal group indicated by each of at least one of the M piece(s) of sub-information is a reference signal in the N1 reference signal(s), N1 being a positive integer.

18. The first base station according to claim 13, wherein for a given sub-information of the M pieces of sub-information, the reference signal in the reference signal group indicated by the given sub-information is transmitted by the second serving cell, the second serving cell is added by the target receiver of the first radio signal, and the given sub-information indicates the index of the second serving cell; the second serving cell being added by the target receiver of the first radio signal comprises that the target receiver of the first radio signal is assigned an SCellIndex or an ServCellIndex for the second serving cell.

* * * * *